United States Patent
Kurumado et al.

(10) Patent No.: US 8,400,143 B2
(45) Date of Patent: *Mar. 19, 2013

(54) SIGNAL PROCESSING CIRCUIT OF ROTATION DETECTOR AND ROTATION ANGLE DETECTOR

(75) Inventors: Norihiro Kurumado, Nagoya (JP); Nobukazu Ooba, Gamagori (JP)

(73) Assignee: Denso Corporation, Kariya (JP)

( * ) Notice: Subject to any disclaimer, the term of this patent is extended or adjusted under 35 U.S.C. 154(b) by 509 days.

This patent is subject to a terminal disclaimer.

(21) Appl. No.: 12/659,349

(22) Filed: Mar. 4, 2010

(65) Prior Publication Data

US 2010/0225308 A1    Sep. 9, 2010

(30) Foreign Application Priority Data

Mar. 5, 2009 (JP) .................................. 2009-51805
May 20, 2009 (JP) .................................. 2009-122375

(51) Int. Cl.
G01B 7/30 (2006.01)
(52) U.S. Cl. ................................. 324/207.25
(58) Field of Classification Search ............... 324/207.25
See application file for complete search history.

(56) References Cited

U.S. PATENT DOCUMENTS

| 2005/0203695 A1 | 9/2005 | Kassner |
| 2007/0139036 A1 | 6/2007 | Kondo |
| 2011/0125456 A1 * | 5/2011 | Kurumado ................... 702/147 |

FOREIGN PATENT DOCUMENTS

| JP | A-58-118908 | 7/1983 |
| JP | A-61-007718 | 1/1986 |
| JP | A-61-266964 | 11/1986 |
| JP | A-1-231420 | 9/1989 |
| JP | A-11-183500 | 7/1999 |

OTHER PUBLICATIONS

Office Action mailed Dec. 28, 2010 issued in corresponding JP patent application No. 2009-051805 (English translation enclosed).
Notice of Allowance mailed Nov. 13, 2012 in corresponding U.S. Appl. No. 12/947,350.

* cited by examiner

Primary Examiner — Reena Aurora
(74) Attorney, Agent, or Firm — Posz Law Group, PLC

(57) ABSTRACT

A signal processing circuit for a rotation detector includes a rotational direction determining portion, an effective edge determining portion, a normal-rotation pulse request holding portion, a reverse-rotation pulse request holding portion, an output request signal outputting portion, a pulse outputting portion, a first resetting portion, and a second resetting portion. When one of the holding portions holds an output request signal, the pulse outputting portion outputs a pulse based on the output request signal. When the other one of the holding portions holds an output request signal and then a condition for holding the output request signal that is already held by the one of the holding portions is satisfied in a state where the one of the holding portions holds the output request signal, the second resetting portion resets the output request signal held by the other one of the holding portion.

15 Claims, 14 Drawing Sheets

| | NORMAL | | REVERSE | |
|---|---|---|---|---|
| FIRST | ↓ | ↑ | ↓ | ↑ |
| SECOND | HI | LO | LO | HI |
| EDGE | EFFECTIVE | INEFFECTIVE | INEFFECTIVE | EFFECTIVE |

<u>PRIOR ART</u>

SIGNAL PROCESSING CIRCUIT OF ROTATION DETECTOR AND ROTATION ANGLE DETECTOR

CROSS REFERENCE TO RELATED APPLICATIONS

The present application is based on and claims priority to Japanese Patent Applications No. 2009-51805 filed on Mar. 5, 2009, and No. 2009-122375 filed on May 20, 2009, the contents of which are incorporated in their entirety herein by reference.

BACKGROUND OF THE INVENTION

1. Field of the Invention

The present invention relates to a signal processing circuit of a rotation detector. The present invention also relates to a rotation angle detector.

2. Description of the Related Art

A conventional rotation detector is disclosed, for example, in US 2007/0139036 A (corresponding to JP-A-2007-170992). The rotation detector includes two magnetic sensors and a signal processing circuit. When a rotor having gear teeth rotates, the two magnetic sensors respectively output rotation detecting signals Sa and Sb having different phases. As shown in FIG. 12, the signal processing circuit determines that a rotational direction of the rotor changes based on a change in a phase relationship between the rotation detecting signals Sa and Sb and generates a reverse signal REV. In addition, the signal processing circuit reads all edges of the rotation detecting signal Sa.

The signal processing circuit generates a level-change prohibiting signal for prohibiting changes in a signal level that synchronize with a first rising edge and a first falling edge of the rotation detecting signal Sa after the change of the rotational direction. Based on the level-change prohibiting signal, the signal processing circuit masks the first pulse of the rotation detecting signal Sa after the change of the rotational direction and generates a first output signal OUT1. Based on the first output signal OUT1 and the reverse signal REV, the signal processing circuit generates a second output signal OUT2 that transitions between a high level (H) and a low level (L) while the rotor is rotating in the normal direction and transitions between the high level (H) and a middle level (M) while the rotor is rotating in the reverse direction.

When the first pulse of the rotation detecting signal Sa after each change of the rotational direction is masked, it may be difficult to detect a rotational motion of the rotor with accuracy based on the second output signal OUT2.

For example, in a case where the rotational direction of the rotor changes with a short period, if the first pulse of the rotation detecting signal Sa after each change of the rotational direction is masked, the second output signal OUT2 does not change while the rotational direction of the rotor successively changes. Thus, when the rotational direction of the rotor successively changes, the signal processing circuit is difficult to detect the rotational motion of the rotor with accuracy.

As an example of a rotation angle detector, a crank angle sensor for detecting a crank angle of an engine is disclosed, for example, in JP-A-58-1180908. An example of the conventional crank angle sensor will be described with reference to FIG. 13 to FIG. 15.

A crank angle sensor shown in FIG. 13 includes magnetic sensors 201 and 202, an amplifier 203, a comparator 204, a filter circuit 205, an N type metal-oxide-semiconductor field-effect transistor (MOSFET) 206, and resistors R201 to R204.

A rotor 210 is fixed in a crankshaft of an engine. The rotor 210 has top lands (teeth, protruding portions) 211 and bottom lands (recessed portions) 212 alternately provided along an outer periphery. The top lands and the bottom lands are made of magnetic material. The magnetic sensors 201 and 202 may be magnetic resistant elements, for example. The magnetic sensors 201 and 202 are opposite the outer periphery of the rotor 210 so that the magnetic sensors 201 and 202 can detect passage of the top lands 211 and the bottom lands 212.

When the rotor 210 rotates with a rotation of the crankshaft and the top lands 211 and the bottom lands 212 pass in front of the magnetic sensors 201 and 202, magnetic resistances of the magnetic sensors 201 and 202 periodically changes with the passage of the top lands 211 and the bottom lands 212. The magnetic sensors 201 and 202 periodically output analog signals to the amplifier 203 in accordance with the change in the magnetic resistances. The amplifier 203 amplifiers the analog signals output from the magnetic sensors 201 and 202. The comparator 204 compares a voltage Vx of an amplified signal output from the amplifier 203 and a threshold voltage Vy that generates at a middle point between a split resistor R201 and a split resistor R202, and outputs a pulse signal (binarized signal) in accordance with a comparison result.

For example, the pulse signal output from the comparator 204 transitions to a high level when the voltage Vx of the amplified signal is greater than or equal to a threshold voltage Vy and transitions to a low level when the voltage Vx of the amplified signal is less than the threshold voltage Vy, as shown in FIG. 14. The pulse signal from the comparator 204 is input to the filter circuit 205. The filter circuit 205 removes noise component in the pulse signal to a certain degree. The filter circuit 205 may be, for example, a low pass filter such as a CR filter circuit or a high pass filter. The pulse signal from the filter circuit 205 is applied to a gate of the N type MOSFET 206. When the pulse signal is at the high level, the N type MOSFET 206 is activated and electric current flows between a drain and a source through a current limiting resistor R203.

A change in the electric current is detected as a change in a voltage in an electronic control unit (ECU) through a pull-up resistor R204. The ECU calculates time intervals of the changes in the detected voltage based on a clock signal, calculates a rotation number of the rotor 210 based on the time intervals, and calculates a crank angle based on the rotation number. Then, the ECU controls an ignition time of the engine and an injection time of fuel based on the calculated crank angle.

The pulse signal output from the comparator 204 may be affected by a noise signal that enters the crank angle sensor, as shown in FIG. 15. For example, a noise signal may enter the crank angle sensor at a time when a portion of the rotor 210 in front of the magnetic sensors 201 and 202 changes from the top land 211 to the bottom land 212 or from the bottom land 212 to the top land 211, and thereby threshold voltage Vy or the voltage Vx of the amplified signal from the amplifier 203 may fluctuate. In such a case, the comparator 204 may output a pulse signal that successively transitions between the high level and the low level although the comparator 204 should output a pulse signal that keeps the high level. The ECU may include an edge level, that is, a voltage of an edge of the pulse signal, caused by the noise signal in the calculation of the crank angle. Thus, the calculated crank angle may be not accurate.

The noise signal can be removed by increasing a time constant (for example, a CR time constant) of the filter circuit 205. However, if the time constant is increased, a time when the filter circuit 205 outputs the pulse signal to the ECU may be delayed. In a case where a crank angle sensor is used for a high-developed engine control, the crank angle sensor is required to detect a crank angle at high speed. Therefore, it is difficult to increase a time constant of a filter circuit.

SUMMARY OF THE INVENTION

In view of the foregoing problems, it is an object of the present invention to provide a signal processing circuit that can output a detection signal accurately indicating a rotational motion of a rotating object even when a rotational direction of the rotating object changes with a short period. Another object of the present invention is to provide a rotating angle sensor that can detect a rotating angle of a rotating object with a high degree of accuracy.

A signal processing circuit of a rotation detector according to a first aspect of the present invention includes a rotational direction determining portion, an effective edge determining portion, a normal-rotation pulse request holding portion, a reverse-rotation pulse request holding portion, an output request signal outputting portion, a pulse outputting portion, a first resetting portion, and a second resetting portion.

The rotational direction determining portion is configured to determine whether a rotational direction of a rotating object is a normal direction or a reverse direction based on a phase relationship between a first sensor signal and a second sensor signal respectively output from a first magnetic sensor and a second magnetic sensor arranged opposite the rotating object having gear teeth.

The effective edge determining portion is configured to determine whether a change in the first sensor signal is caused by an effective edge. The effective edge determining portion determines that the change in the first sensor signal is caused by the effective edge when the change is caused by one of front edges of top lands of the gear teeth while the rotating object is rotating in one of the normal direction and the reverse direction or when the change is caused by one of rear edges of the top lands while the rotating object is rotating in the other one of the normal direction and the reverse direction.

The normal-rotation pulse request holding portion is configured to hold an output request signal of a normal-rotation pulse when the rotational direction determining portion determines that the rotational direction is the normal direction and the effective edge determining portion determines that the change in the first sensor signal is caused by the effective edge. The normal-rotation pulse indicates that the rotating object is rotating in the normal direction.

The reverse-rotation pulse request holding portion is configured to hold an output request signal of a reverse-rotation pulse when the rotational direction determining portion determines that the rotational direction is the reverse direction and the effective edge determining portion determines that the change in the first sensor signal is caused by the effective edge. The reverse-rotation pulse indicates that the rotating object is rotating in the reverse direction.

When one of the normal-rotation pulse request holding portion and the reverse-rotation pulse request holding portion holds the output request signal, the output request signal outputting portion permits an output of the output request signal held by the one of the normal-rotation pulse request holding portion and the reverse-rotation pulse request holding portion. When the other one of the normal-rotation pulse request holding portion and the reverse-rotation pulse request holding portion holds the output request signal in a state where the one of the normal-rotation pulse request holding portion and the reverse-rotation pulse request holding portion holds the output request signal, the output request signal outputting portion waits an output of the output request signal held by the other one of the normal-rotation pulse request holding portion and the reverse-rotation pulse request holding portion until the output request signal held by the one of the normal-rotation pulse request holding portion and the reverse-rotation pulse request holding portion is reset.

The pulse outputting portion is configured to output one of the normal-rotation pulse and the reverse-rotation pulse based on the output request signal output from the output request signal outputting portion.

After the pulse outputting portion ends an output of the one of the normal-rotation pulse and the reverse-rotation pulse, the first resetting portion resets the output request signal of the one of the normal-rotation pulse and the reverse-rotation pulse held by the one of the normal-rotation pulse request holding portion and the reverse-rotation pulse request holding portion.

When the other one of the normal-rotation pulse request holding portion and the reverse-rotation pulse request holding portion holds the output request signal and then a condition for holding the output request signal that is already held by the one of the normal-rotation pulse request holding portion and the reverse-rotation pulse request holding portion is satisfied in a state where the one of the normal-rotation pulse request holding portion and the reverse-rotation pulse request holding portion holds the output request signal, the second resetting portion resets the output request signal held by the other one of the normal-rotation pulse request holding portion and the reverse-rotation pulse request holding portion.

The signal processing circuit according to the first aspect can output a detection signal including the normal-rotation pulse or the reverse-rotation pulse and indicating a rotational motion of the rotating object with accuracy even when the rotational direction of the rotating object changes with a short period.

A rotating angle sensor according to a second aspect of the present invention includes a detecting portion, a pulse signal generating circuit, an edge level holding circuit, and a signal outputting circuit. The detecting portion is configured to output an analog signal having an intensity that periodically changes in accordance with a change in a rotating angle of a rotating object. The pulse signal generating circuit is configured to compare the analog signal output from the detecting portion with a predetermined threshold value and generate a pulse signal based on a comparison result. The edge level holding circuit is configured to detect a first edge level of a first pulse signal that is generated by the pulse signal generating circuit in a half period of the analog signal and hold the first edge level for a predetermined time since the edge level holding circuit detects the first edge level. The signal outputting circuit is configured to output a signal having an edge level same as the first edge level held by the edge level holding circuit. The edge level holding circuit ignores an edge level of the pulse signal other than the first edge level at least until the signal outputting circuit outputs the signal.

The rotating angle sensor according to the second aspect of the present invention can detect the rotating angle of the rotating object with a high degree of accuracy.

A rotating angle sensor according to a third aspect of the present invention includes a detecting portion, a pulse signal generating circuit, and a signal outputting circuit. The detecting portion is configured to output an analog signal having an intensity that periodically changes in accordance with a change in a rotating angle of a rotating object. The pulse signal generating circuit is configured to compare the analog signal output from the detecting portion with a predetermined threshold value and generate a pulse signal based on a comparison result. The signal outputting circuit is configured to detect a first edge level of a first pulse signal that is generated by the pulse signal generating circuit in a half period of the analog signal and continuously output a signal having the first edge level for a predetermined time from when the signal outputting circuit detects the first edge level till when the detecting portion outputs the analog signal in a next half period.

The rotating angle sensor according to the third aspect of the present invention can detect the rotating angle of the rotating object with a high degree of accuracy.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

First Embodiment

Figure 1:
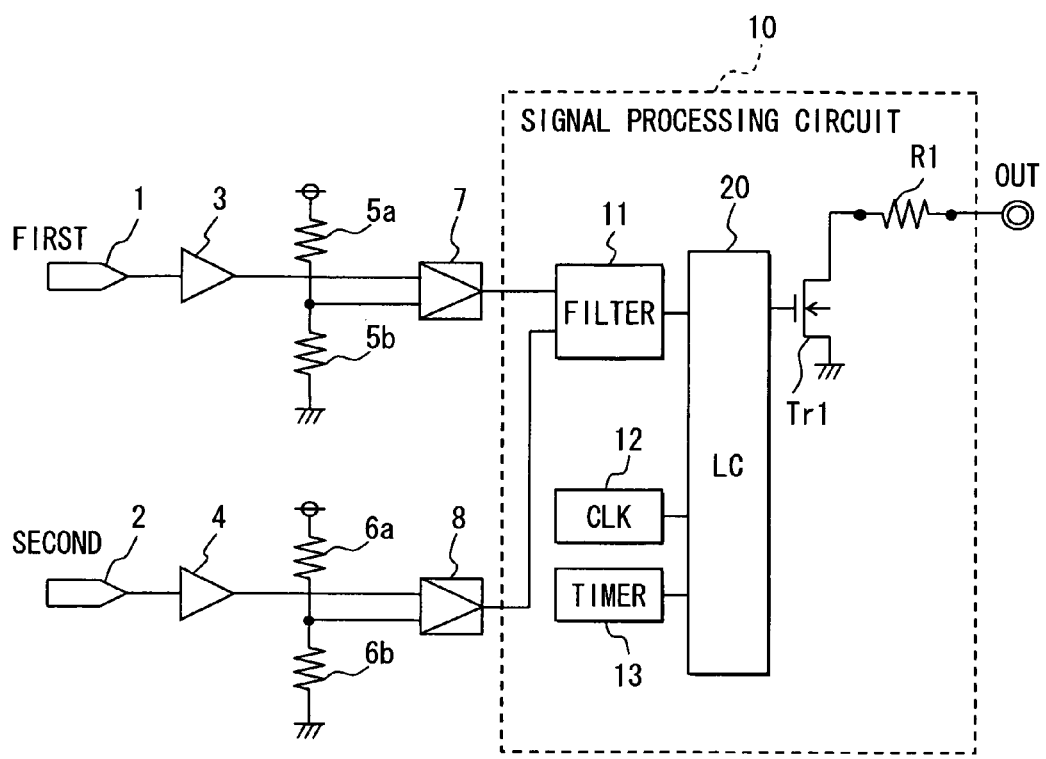
FIG. 1 is a block diagram showing a rotational detector according to a first embodiment of the present invention.

A rotation detector according to a first embodiment of the present invention will be described with reference to FIG. 1.

The rotation detector includes a first magnetic sensor 1 and a second magnetic sensor 2. Each of the first magnetic sensor 1 and the second magnetic sensor 2 includes a magneto-electric transducer such as, for example, a magneto-resistance element and a hall element. The first magnetic sensor 1 and the second magnetic sensor 2 have a predetermined distance therebetween and are opposite an outer peripheral surface of a rotor (not shown). The rotor is made of a magnetic material, and gear teeth are formed at an outer periphery. Thus, when the rotor rotates, the first magnetic sensor 1 and the second magnetic sensor 2 output periodical signals having different phases (for example, ¼ cycle).

When the rotator rotates, top lands and bottom lands of the gear teeth alternately pass in front of the first magnetic sensor 1 and the second magnetic sensor 2. Thus, magnetic fields applied to the magneto-electric transducers in the first magnetic sensor 1 and the second magnetic sensor 2' periodically changes. The changes in the magnetic field are converted into electric signals by the magneto-electric transducers in the first magnetic sensor 1 and a second magnetic sensor 2. After the electric signals are respectively amplified by amplifiers 3 and 4, the electric signals are respectively input to comparators 7 and 8. The comparators 7 and 8 respectively binarize the amplified electric signals by comparing with reference voltages generated by resistors 5a, 5b and resistors 6a, 6b so as to provide a first sensor signal and a second sensor signal.

Each of the first sensor signal and the second sensor signal has a rectangular wave shape that changes with passage of the top lands and the bottom lands of the gear teeth of the rotor. The sensor signals are input to a signal processing circuit 10.

The signal processing circuit 10 generates a detection signal for detecting a rotational position and a rotational direction of the rotor based on the first sensor signal and the second sensor signal and outputs the detection signal. The signal processing circuit 10 includes a filter 11, a clock signal generator (CLK) 12, a timer 13, a logic circuit 20, a transistor Tr1, and a resistor R1.

The filter 11 removes high frequency components in the first sensor signal and the second sensor signal input to the signal processing circuit 10. Thus, the logic circuit 20 receives the first sensor signal and the second sensor signal from which the high frequency components are removed by the filter 11.

In the signal processing circuit 10 according to the present embodiment, a concept of an effective edge and an ineffective edge is introduced to changes in the first sensor signal. While the rotor is rotating in one of a normal direction and a reverse direction, a change in the first sensor signal caused by one of front edges of the top lands is defined as a change caused by an effective edge, and a change in the first sensor signal caused by one of rear edges of the top lands is defined as a change caused by an ineffective edge. While the rotor is rotating in the other one of the normal direction and the reverse direction, a changes in the first sensor signal caused by one of the rear edges of the top lands is defined as a change caused by an effective edge, and a change in the first sensor signal caused by one of the front edges of the top lands is defined as a change caused by an ineffective edges. Thus, the changes in the first sensor signal caused by one-side edges of the top lands are defined as signal changes caused by the effective edges and the changes in the first sensor signal caused by the other-side edges of the top lands are defined as signal changes caused by the ineffective edges regardless of the rotational direction of the rotor.

When the change in the first sensor signal is caused by the effective edge while the rotor is rotating in the normal direction, the logic circuit 20 generates a normal-rotation pulse. When the change in the first sensor signal is caused by the effective edge while the rotor is rotating in the reverse direction, the logic circuit 20 generates a reverse-rotation pulse. The logic circuit 20 generates a detection signal by combining the normal-rotation pulse and the reverse-rotation pulse. The detection signal of the logic circuit 20 is input to a base of the transistor Tr1. Then, the detection signal is amplified by the resistor R1 and is output from an output terminal OUT to a control device (for example, ECU) for detecting a rotation of the rotor.

The signal processing circuit 10 sets that the normal-rotation pulse and the reverse-rotation pulse have different pulse widths. For example, the pulse width of the normal-rotation pulse is set to be 45 μs and the pulse width of the reverse-rotation pulse is set to be 90 μs. Because the pulse widths of the pulse signals differ according to the rotational direction, the control device such as an ECU can also detect the rotational direction of the rotor based on the detection signal. Instead of changing the pulse widths, the signal processing circuit 10 may also change the detection signal between a high level and a low level or between a middle level and a low level when the rotational direction of the rotor changes between the normal direction and the reverse direction in a manner similar to a method disclosed in US 2007/0139036 A.

Next, the changes in the first sensor signal caused by the effective edges and the changes in the first sensor signal caused by the ineffective edges will be described with reference to FIG. 2 and FIG. 3.

Figures 2, 3:
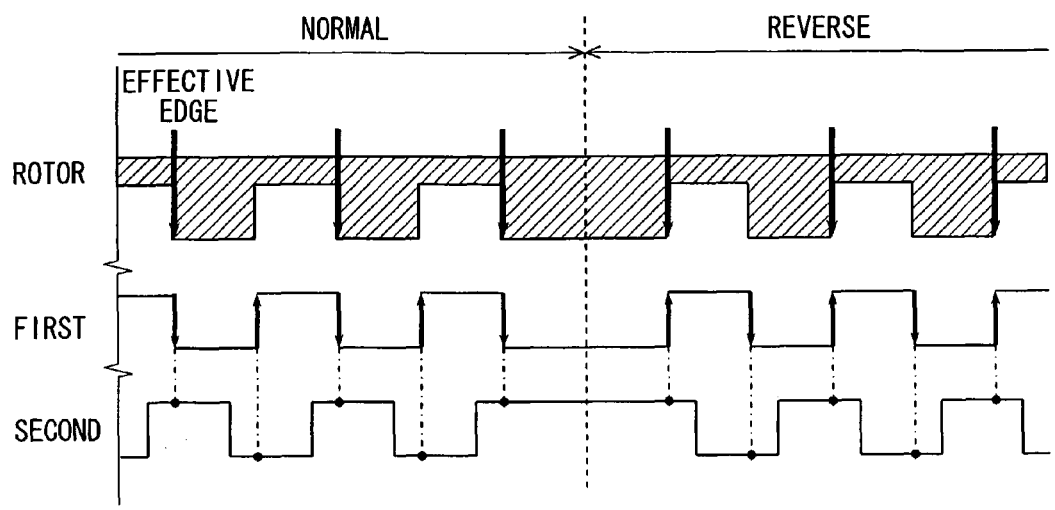
FIG. 2 is a diagram showing a relationship among changes in a first sensor signal and a second sensor signal caused by top lands and bottom lands of gear teeth of a rotor and an effective edge and an ineffective edge.
FIG. 3 is a diagram showing the relationship among the changes in the first sensor signal and the second sensor signal and the effective edge and ineffective edge.

In an example shown in FIG. 2, while the rotor is rotating in the normal direction, the changes in the first sensor signal caused by the front edges of the top lands of the gear teeth are defined as the signal changes caused by the effective edges, and the changes in the first sensor signal caused by the rear edges of the top lands are defined as the signal changes caused by the ineffective edges. In the present case, as shown in FIG. 3, falling edges of the first sensor signal become the signal changes caused by the effective edges and rising edges of the first sensor signal become the signal changes caused by the ineffective edges. While the rotor is rotating in the reverse direction, the changes in the first sensor signal caused by the rear edges of the top lands of the gear teeth are defined as the signal changes caused by the effective edges, and the changes in the first sensor signal caused by the front edges of the top lands are defined as the signal changes caused by the ineffective edges. In the present case, rising edges of the first sensor signal become the signal changes caused by the effective edges and falling edges of the first sensor signal become the signal changes caused by the ineffective edges.

As described above, while the rotor is rotating in the normal direction, the changes in the first sensor signal caused by the front edges of the top lands are defined as the signal changes caused by the effective edges. While the rotor is rotating in the reverse direction, the changes in the first sensor signal caused by the rear edges of the top lands are defined as the signal changes caused by the effective edges. Thus, the changes in the first sensor signal caused by one-side edges of the top lands become the signal changes caused by the effective edges regardless of the rotational direction of the rotor.

The logic circuit 20 can determine whether the rotational direction of the rotor is the normal direction or the reverse direction based on a phase relationship between the first sensor signal and the second sensor signal. In the example shown in FIG. 2, while the rotor is rotating in the normal direction, the phase of the first sensor signal is ahead of the phase of the second sensor signal. Thus, the second sensor signal transitions to the high level when the first sensor signal falls, and the second sensor signal transitions to the low level when the first sensor signal rises. In contrast, while the rotor is rotating in the reverse direction, the phase of the second sensor signal is ahead of the phase of the first sensor signal. Thus, the second sensor signal transitions to the high level when the first sensor signal rises, and the second sensor signal transitions to a low level when the first sensor signal falls. The logic circuit 20 can determine whether the rotational direction of the rotor is the normal direction or the reverse direction based on the level of the second sensor signal at a time when the first sensor signal rises or falls.

The above-described relationships are shown in FIG. 3. The relationship between the effective edge and the ineffective edge may also be reversed. That is, while the rotor is rotating in the normal direction, the changes, in the first sensor signal caused by the rear edges of the top lands may also be defined as the signal changes caused by the effective edge and the changes in the first sensor signal caused by the front edges of the top lands may also be defined as the signal changes caused by the ineffective edges.

An exemplary configuration and exemplary operation of the logic circuit 20 will be described with reference to FIG. 4 to FIG. 6.

Figure 4:
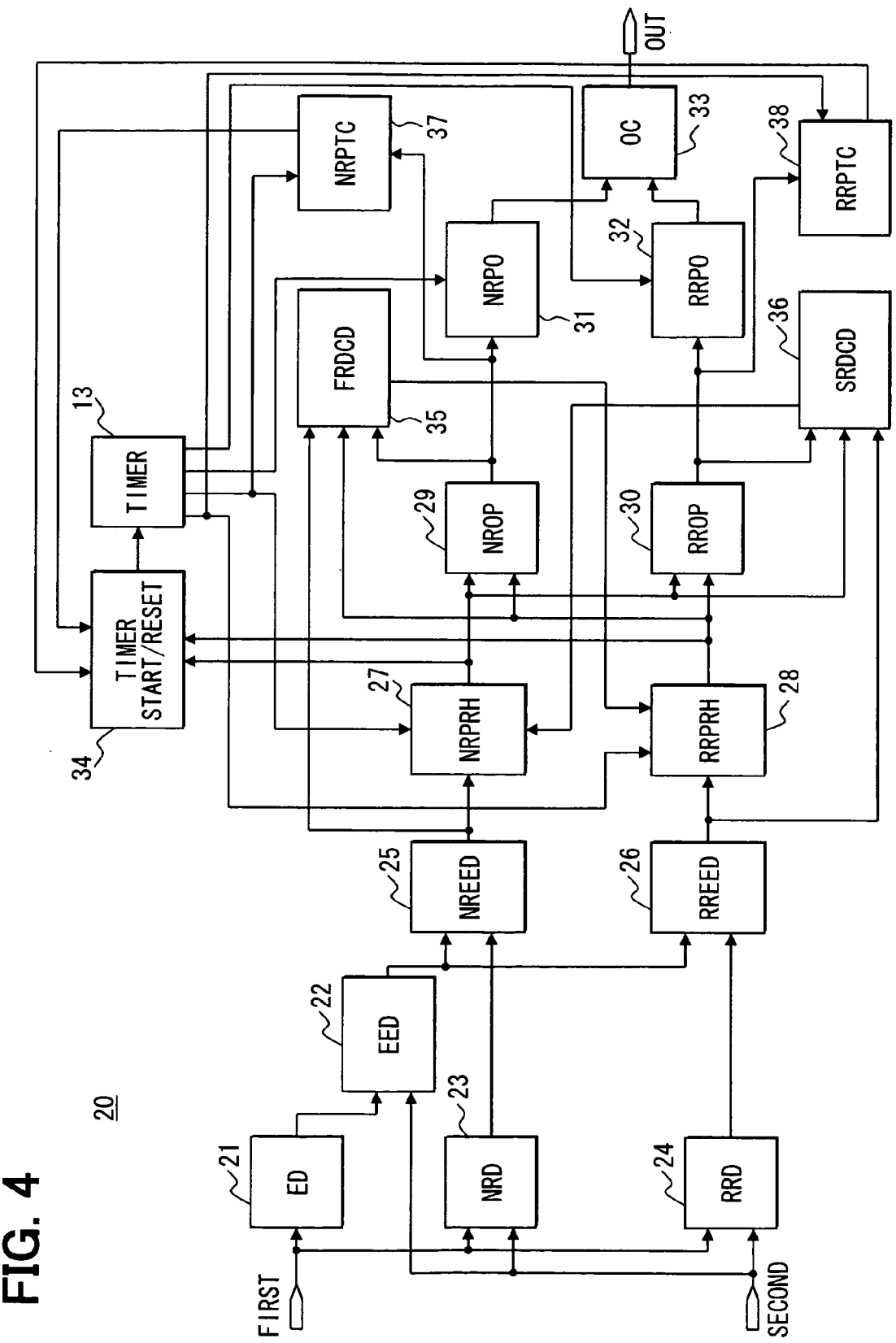
FIG. 4 is a block diagram showing a logic circuit according to the first embodiment.

As shown in FIG. 4, the first sensor signal is input to an edge detecting circuit (ED) 21. The edge detecting circuit 21 detects the rising edges and the falling edges of the first sensor signal caused by the front edges and the rear edges of the top lands of the gear teeth and outputs an edge detecting signal. The edge detecting signal and the second sensor signal are input to an effective edge determining circuit (EED) 22.

Figure 5:
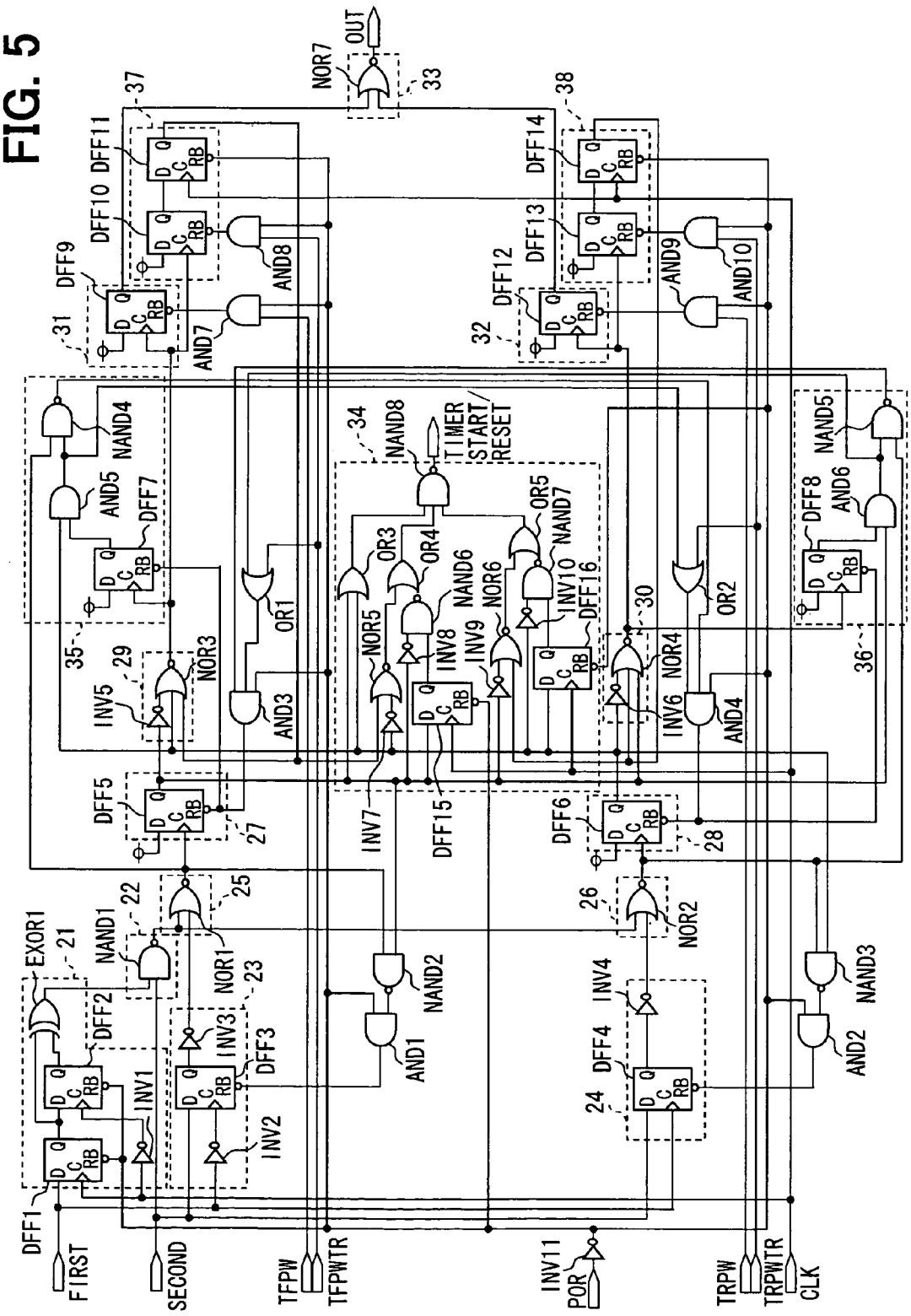
FIG. 5 is a circuit diagram showing the logic circuit according to the first embodiment.

As shown in FIG. 5, the edge detecting circuit 21 includes two delayed flip flop (DFF) circuits DFF1 and DFF2, an exclusive-OR (EXOR) circuit EXOR1, and an inverter INV1. The first sensor signal is input to a input terminal D of the DFF circuit DFF1, and the DFF circuit DFF1 outputs an output signal from a data output terminal Q. The output signal from the DFF circuit DFF1 is input to a input terminal D of the DFF circuit DFF2. The clock signal from the clock signal generator 12 is input to each clock terminals C of the DFF circuits DFF1 and DFF2. A phase of the clock signal of the DFF circuit DFF1 and a phase of the clock signal of the DFF circuit DFF2 are inverted by the inverter INV1. The clock signal has a frequency of, for example, a few MHz. The frequency of the clock signal is set to be sufficiently higher than frequencies of the first sensor signal and the second sensor signal which are about 10 kHz at the maximum.

When the first sensor signal rises or falls, the output signal of the DFF circuit DFF1 changes first. Then, the output signal of the DFF circuit DFF2 changes after one clock delay. Because the output signal of the DFF circuit DFF1 and the output signal of the DFF circuit DFF2 are different for one clock when the first sensor rises or falls, the EXOR circuit EXOR1 outputs an edge detecting signal at the high level.

When the edge detecting signal from the edge detecting circuit 21 is input, the effective edge determining circuit 22 determines whether the change in the first sensor signal is caused by the effective edge or the ineffective edge based on the level of the second sensor signal which is input at the same time. When the effective edge determining circuit 22 determines that the signal change is caused by the effective edge, the effective edge determining circuit 22 outputs an effective edge signal. The effective edge determining circuit 22 includes a NAND circuit NAND1 as shown in FIG. 5. In a case where the edge detecting signal at the high level is input, the effective edge determining circuit 22 outputs the effective edge signal at the low level only when the second sensor signal is at the high level.

Each of a normal-rotation determining circuit (NRD) 23 and a reverse-rotation determining circuit (RRD) 24 receives the first sensor signal and the second sensor signal and determines the rotational direction of the rotor based on the phase relationship between the first sensor signal and the second sensor signal. When the normal-rotation determining circuit 23 determines that the rotor rotates in the normal direction, the normal-rotation determining circuit 23 outputs a normal-rotation signal. When the reverse-rotation determining circuit 24 determines that the rotor rotates in the reverse direction, the reverse-rotation determining circuit 24 outputs a reverse-rotation signal.

As shown in FIG. 5, the normal-rotation determining circuit 23 includes inverters INV2, INV3, and a DFF circuit DFF3. The reverse-rotation determining circuit 24 includes an inverter INV4 and a DFF circuit DFF4. The first sensor signal is input to a clock terminal C of the DFF circuit DFF3 through the inverter INV2. The first sensor signal is also input to a clock terminal C of the DFF circuit DFF4. The second sensor signal is input to each input terminal D of the DFF circuits DFF3 and DFF4. The inverters INV3 and INV4 are coupled to output terminals Q of the DFF circuits DFF3 and DFF4 respectively.

As described above, the first sensor signal is input to the clock terminal C of the DFF circuit DFF3 through the inverter INV2. Thus, when the first sensor signal falls, the DFF circuit DFF3 reads the level of the second sensor signal input to the input terminal D and outputs a signal at the reading level from the output terminal Q. As shown in FIG. 3, when the rotor rotates in the normal direction, the second sensor signal is at the high level at a time when the first sensor signal falls. When the rotor rotates in the reverse direction, the second sensor signal is at the low level at a time when the first sensor signal falls. Thus, when the rotor rotates in the normal direction, the signal at the high level output from the DFF circuit DFF3 is inverted to a normal-rotation signal at the low level by the inverter INV3, and when the rotor rotates in the reverse direction, the signal at the low level output from the DFF circuit DFF3 is inverted to a non normal-rotation signal at the high level by the inverter INV3.

The first sensor signal is also input to the clock terminal C of the DFF circuit DFF4 directly. Thus, when the first sensor signal rises, the DFF circuit DFF4 reads the level of the second sensor signal input to the input terminal D and outputs a signal at the reading level from the output terminal Q. When the rotor rotates in the reverse direction, the signal at the high level is output from the DFF circuit DFF4 and is inverted to a reverse-rotation signal at the low level by the inverter INV4. When the rotor rotates in the normal direction, the signal at the low level output from the DFF circuit DFF4 and is inverted to a non-reverse-rotation signal at the high level by the inverter INV4.

In the logic circuit 20 shown in FIG. 4, when a normal-rotation effective edge determining circuit (NREED) 25 receives the effective edge signal from the effective edge determining circuit 22 while the normal-rotation signal is input from the normal-rotation determining circuit 23, the normal-rotation effective edge determining circuit 25 determines that a signal change in the first sensor signal is caused by the effective edge while the rotor is rotating in the normal direction and outputs an output request signal of the normal-rotation pulse. The output request signal of the normal-rotation pulse is input to a normal-rotation pulse request holding circuit (NRPRH) 27. The normal-rotation effective edge determining circuit 25 includes a NOR circuit NOR1 as shown in FIG. 5. When the effective edge signal at the low level is input from the effective edge determining circuit 22 and the normal-rotation signal at the low level is input from the normal-rotation determining circuit 23, the normal-rotation effective edge determining circuit 25 generates the output request signal of the normal-rotation pulse at the high level. Thus, the output signal of the normal-rotation effective edge determining circuit 25 transitions from the low level to the high level.

The normal-rotation pulse request holding circuit 27 holds the output request signal of the normal-rotation pulse generated by the normal-rotation effective edge determining circuit 25 except for a case where the normal-rotation pulse request holding circuit 27 already holds the output request signal of the normal-rotation pulse. The normal-rotation pulse request holding circuit 27 includes a DFF circuit DFF5 as shown in FIG. 5. The output signal from the normal-rotation effective edge determining circuit 25 is input to a clock terminal C of the DFF circuit DFF5. An input terminal D of the DFF circuit DFF5 is coupled with a pull-up power source. Thus, when the output signal from the normal-rotation effective edge determining circuit 25 transitions from the low level to the high level, the DFF circuit DFF5 outputs a signal at the high level, that is, the output request signal of the normal-rotation pulse, from an output terminal Q. The DFF circuit DFF5 holds the output request signal of the normal-rotation pulse until a reset signal at the low level is input to a reset terminal RB of the DFF circuit DFF5.

The output signal from the normal-rotation effective edge determining circuit 25 and the output signal from the normal-rotation pulse request holding circuit 27 are input to a NAND circuit NAND2. An output signal from the NAND circuit NAND2 is input to a reset terminal RB of the DFF circuit DFF3 in the normal-rotation determining circuit 23 through an AND circuit AND1. Thus, at a time when both the normal-rotation effective edge determining circuit 25 and the normal-rotation pulse request holding circuit 27 output the output request signals at the high level, an output signal of the NAND circuit NAND2 transitions to the low level and the DFF circuit DFF3 is reset. The other input signal of the AND circuit AND1 is power on reset (POR) signal.

When a reverse-rotation effective edge determining circuit (RREED) 26 receives the effective edge signal from the effective edge determining circuit 22 while the reverse-rotation signal is input from the reverse-rotation determining circuit 24, the reverse-rotation effective edge determining circuit 26 determines that the signal change in the first sensor signal is caused by the effective edge while the rotor is rotating in the reverse direction and outputs an output request signal of the reverse-rotation pulse. The output request signal of the reverse-rotation pulse is input to a reverse-rotation pulse request holding circuit (RRPRH) 28. The reverse-rotation effective edge determining circuit 26 includes a NOR circuit NOR2 as shown in FIG. 5. When the effective edge signal at the low level is input from the effective edge determining circuit 22 and the reverse-rotation signal at the low level is input from the reverse-rotation determining circuit 24, the reverse-rotation effective edge determining circuit 26 generates the output request signal of the reverse-rotation pulse at the high level.

The reverse-rotation pulse request holding circuit 28 holds the output request signal of the reverse-rotation pulse generated by the reverse-rotation effective edge determining circuit 26 except for a case where the reverse-rotation pulse request holding circuit 28 already holds the output request signal of the reverse-rotation pulse. The reverse-rotation pulse request holding circuit 28 includes a DFF circuit DFF6 as shown in FIG. 5. The output signal from the reverse-rotation effective edge determining circuit 26 is input to a clock terminal C of the DFF circuit DFF6. An input terminal D of the DFF circuit DFF6 is coupled with a pull-up power source. Thus, when the output signal from the reverse-rotation effective edge determining circuit 26 transitions from the low level to the high level, the DFF circuit DFF6 outputs a signal at the high level, that is, the output request signal of the reverse-rotation pulse from an output terminal Q. The DFF circuit DFF6 holds the output request signal of the reverse-rotation pulse until a reset signal at the low level is input to a reset terminal RB of the DFF circuit DFF6.

In a manner similar to the normal-rotation determining circuit 23, the output signal from the reverse-rotation effective edge determining circuit 26 and the output signal from the reverse-rotation pulse request holding circuit 28 are input to a NAND circuit NAND3. An output signal from the NAND circuit NAND3 is input to a reset terminal RB of the DFF circuit DFF4 in the reverse-rotation determining circuit 24 through an AND circuit AND2. Thus, at a time when both the reverse-rotation effective edge determining circuit 26 and the reverse-rotation pulse request holding circuit 28 output the output request signals at the high level, the DFF circuit DFF4 is reset.

When the normal-rotation pulse request holding circuit 27 holds the output request signal of the normal-rotation pulse, the normal-rotation pulse request holding circuit 27 outputs the holding output request signal to a normal-rotation output permitting circuit (NROP) 29 and a reverse-rotation output permitting circuit (RROP) 30. The reverse-rotation pulse output request signal is also input to the normal-rotation output permitting circuit 29 when the reverse-rotation pulse request holding circuit 28 holds the output request signal of the reverse-rotation pulse. When the output request signal of the normal-rotation pulse is input to the normal-rotation output permitting circuit 29 while the output request signal of the reverse-rotation pulse is not being input, the normal-rotation output permitting circuit 29 permits outputting the output request signal of the normal-rotation pulse to the subsequent circuits. When, the output request signal of the normal-rotation pulse is input to the normal-rotation output permitting circuit 29 later than the output request signal of the reverse-rotation pulse while the output request signal of the reverse-rotation pulse is being input, the normal-rotation pulse permitting circuit 29 waits an output of the output request signal of the normal-rotation pulse until the output request signal of the reverse-rotation pulse held by the reverse-rotation pulse request holding circuit 28 is reset and an input of the output request signal of the reverse-rotation pulse from the reverse-rotation pulse request holding circuit 28 ends.

As shown in FIG. 5, the normal-rotation output permitting circuit 29 includes an inverter INV5 and a NOR circuit NOR3. The output signal from the normal-rotation pulse request holding circuit 27 is input to the NOR circuit NOR3 through the inverter INV5. The output signal from the reverse-rotation pulse request holding circuit 28 and an output signal from a normal-rotation pulse timing control circuit (NRPTC) 37 are also input to the NOR circuit NOR3. Before the start of outputting the normal-rotation pulse, the normal-rotation pulse timing control circuit 37 outputs a signal at the low level. When the output of the normal-rotation pulse is started, the normal-rotation pulse timing control circuit 37 outputs a signal at the high level. Thus, the NOR circuit NOR3 permits outputting the output request signal of the normal-rotation pulse at the high level when the normal-rotation pulse request holding circuit 27 holds the output request signal of the normal-rotation pulse at the high level, the reverse-rotation pulse request holding circuit 28 does not hold the output request signal of the reverse-rotation pulse at the high level, and the normal-rotation pulse timing control circuit 37 outputs the signal at the low level. When the reverse-rotation pulse request holding circuit 28 holds the output request signal of the reverse-rotation pulse at the high level, the NOR circuit NOR3 waits the output of the output request signal of the normal-rotation pulse until the output request signal of the reverse-rotation pulse is reset. When the normal-rotation pulse is actually output based on an output permission of the output request signal of the normal-rotation pulse, the normal-rotation pulse timing control circuit 37 starts to output the signal at the high level. Thus, since then, the normal-rotation output permitting circuit 29 prohibits the output of the output request signal of the normal-rotation pulse until the output of the normal-rotation pulse ends.

When the reverse-rotation pulse request holding circuit 28 holds the output request signal of the reverse-rotation pulse, the reverse-rotation pulse request holding circuit 28 outputs the holding output request signal to the normal-rotation output permitting circuit 29 and the reverse-rotation output permitting circuit 30. When the output request signal of the reverse-rotation pulse is input to the reverse-rotation output permitting circuit 30 while the output request signal of the normal-rotation pulse is not being input, the reverse-rotation output permitting circuit 30 permits outputting the output request signal of the reverse-rotation pulse to the subsequent circuits. When the output request signal of the reverse-rotation pulse is input to the reverse-rotation output permitting circuit 30 later than the output request signal of the normal-rotation pulse while the output request signal of the normal-rotation pulse is being input, the reverse-rotation pulse permitting circuit 30 waits the output of the output request signal of the reverse-rotation pulse until the output request signal of the normal rotation pulse held by the normal-rotation pulse request holding circuit 27 is reset and an input of the output request signal of the normal-rotation pulse from the normal-rotation pulse request holding circuit 27 ends.

As shown in FIG. 5, the reverse-rotation output permitting circuit 30 includes an inverter INV6 and a NOR circuit NOR4. The output signal from the reverse-rotation pulse request holding circuit 28 is input to the NOR circuit NOR4 through the inverter INV6. The output signal from the normal-rotation pulse request holding circuit 27 and an output signal from a reverse-rotation pulse timing control circuit (RRPTC) 38 are also input to the NOR circuit NOR4. Before the start of outputting the reverse-rotation pulse, the reverse-rotation pulse timing control circuit 38 outputs a signal at the low level. When the output of the reverse-rotation pulse is started, the reverse-rotation pulse timing control circuit 38 outputs a signal at the high level. Thus, the NOR circuit NOR4 permits outputting the output request signal of the reverse-rotation pulse at the high level when the normal-rotation pulse request holding circuit 27 does not hold the output request signal of the normal-rotation pulse at the high level, the reverse-rotation pulse request holding circuit 28 holds the output request signal of the reverse-rotation pulse at the high level, and the reverse-rotation pulse timing control circuit 38 outputs the signal at the low level. When the normal-rotation pulse request holding circuit 27 holds the output request signal of the normal-rotation pulse at the high level, the reverse-rotation output permitting circuit 30 waits the output of the output request signal of the reverse-rotation pulse until the output request signal of the normal-rotation pulse is reset. When the reverse-rotation pulse is actually output based on an output permission of the output request signal of the reverse-rotation pulse, the reverse-rotation pulse timing control circuit 38 starts to output the signal at the high level. Thus, since then, the reverse-rotation output permitting circuit 30 prohibits the output of the output request signal of the reverse-rotation pulse until the output of the reverse-rotation pulse ends.

When the normal-rotation output permitting circuit 29 permits outputting the output request signal of the normal-rotation pulse, the output request signal of the normal-rotation pulse is input to a normal-rotation pulse outputting circuit 31. The normal-rotation pulse outputting circuit 31 includes a DFF circuit DFF9 as shown in FIG. 5. The output signal from the normal-rotation output permitting circuit 29 is input to a clock terminal C of the DFF circuit DFF9. An input terminal D is coupled with a pull-up power source. Thus, when the output request signal of the normal-rotation pulse is output from the normal-rotation output permitting circuit 29 and the output request signal of the normal-rotation pulse transitions from the low level to the high level, the DFF circuit DFF9 outputs a signal at the high level from an output terminal Q.

When the reverse-rotation output permitting circuit 30 permits outputting the output request signal of the reverse-rotation pulse, the output request signal of the reverse-rotation pulse is input to a reverse-rotation pulse outputting circuit (RRPO) 32. The reverse-rotation pulse outputting circuit 32 includes a DFF circuit DFF12 as shown in FIG. 5. The output signal from the reverse-rotation output permitting circuit 30 is input to a clock terminal C of the DFF circuit DFF12. An input terminal D of the DFF circuit DFF12 is coupled, with a pull-up power source. Thus, when the output request signal of the reverse-rotation pulse is output from the reverse-rotation output permitting circuit 30 and the output request signal of the reverse-rotation pulse transitions from the low level to the high level, the DFF circuit DFF12 outputs a signal at the high level from an output terminal Q.

The output signal from the normal-rotation pulse outputting circuit 31 and the output signal from the reverse-rotation pulse outputting circuit 32 are input to an output combining circuit (OC) 33. The output combining circuit 33 combines the normal-rotation pulse and the reverse-rotation pulse. The output combining circuit 33 includes a NOR circuit NOR7 as shown in FIG. 5. When a signal at the high level is input from the normal-rotation pulse outputting circuit 31, the output combining circuit 33 outputs the normal-rotation pulse at the low level. When a signal at the high level is input from the reverse-rotation pulse outputting circuit 32, the output combining circuit 33 outputs the reverse-rotation pulse at the low level.

As described above, in the signal processing circuit 10 according to the present embodiment, the pulse width of the normal-rotation pulse is set to be different from the pulse width of the reverse-rotation pulse. The pulse width of the normal-rotation pulse and the pulse width of the reverse-rotation pulse are controlled using a count function of the timer 13.

As shown in FIG. 4, the normal-rotation pulse request holding circuit 27 and the reverse-rotation pulse request holding circuit 28 respectively output the output request signal of the normal-rotation pulse and the output request signal of the reverse-rotation pulse to a timer start/reset circuit 34. When one of the output request signal of the normal-rotation pulse and the output request signal of the reverse-rotation pulse is input, the timer start/reset circuit 34 outputs a start signal to the timer 13 so that the timer 13 starts to count.

The timer start/reset circuit 34 includes an OR circuit OR3. The output signals from the normal-rotation pulse request holding circuit 27 and the reverse-rotation pulse request holding circuit 28 are input to the OR circuit OR3. When one of the normal-rotation pulse request holding circuit 27 and the reverse-rotation pulse request holding circuit 28 holds the output request signal, the OR circuit OR3 outputs a signal at the high level. The timer start/reset circuit 34 also includes a NAND circuit NAND8 for outputting the start signal or a reset signal. When the OR circuit OR3 outputs the signal at the high level, the output signal of the NAND circuit NAND8 transitions from the high level to the low level. The transition of the output signal of the NAND circuit NAND8 from the high level to the low level provides the start signal of the timer 13, and the timer 13 starts to count a time from when one of the normal-rotation pulse request holding circuit 27 and the reverse-rotation pulse request holding circuit 28 holds the output request signal.

In the timer 13, a first predetermined time, a second predetermined time, and a third predetermined time are set. The first predetermined time corresponds to the pulse width of the normal-rotation pulse. The second predetermined time corresponds to the pulse width of the reverse-rotation pulse. The third predetermined time corresponds to an adjusting time for securing intervals between successive pulses after the output of the normal-rotation pulse or the reverse-rotation pulse ends, that is, after the first predetermined time or the second predetermined time elapses. When a count time reaches the first predetermined time corresponding to the pulse width of the normal-rotation pulse, the timer 13 outputs a first normal-rotation reset signal TFPW to the normal-rotation pulse outputting circuit 31 for stopping the output of the normal-rotation pulse.

The timer 13 outputs the first normal-rotation reset signal TFPW at the low level when the count time reaches the first predetermined time. As shown in FIG. 5, the first rotation reset signal TFPW is input to a reset terminal RB of the DFF circuit DFF9 through an AND circuit AND7. To the other input terminal of the AND circuit AND7, a power on reset (POR) signal is input through an inverter INV11. When the signal processing circuit 10 is powered on, the POR signal transitions to the low level so as to reset each of the DFF circuits (the actual POR signal in front of the inverter INV11 is at the high level). However, the POR signal keeps the high level except for the time when the power source of the signal processing circuit is powered on. Thus, when the timer 13 outputs the first normal-rotation reset signal TFPW at the low level, the reset signal at the low level is input to the reset terminal RB of the DFF circuit DFF9, and thereby the DFF circuit DFF9 is reset. Then, a level of an output signal of the DFF circuit DFF9 transitions to the low level, and the output of the normal-rotation pulse ends. In the above described way, the normal-rotation pulse outputting circuit 31 outputs the normal-rotation pulse having the pulse width corresponding to the first predetermined time.

The timer 13 continues to count after outputting the first normal-rotation reset signal TFPW to the normal-rotation pulse outputting circuit 31. When the count time after outputting the first normal-rotation reset signal reaches the third predetermined time, the timer 13 outputs a second normal-rotation reset signal (TFPWTR) to the normal-rotation pulse request holding circuit 27 so as to reset the output request signal of the normal-rotation pulse held by the normal-rotation pulse request holding circuit 27.

The second normal-rotation reset signal TFPWTR is input to the reset terminal RB of the DFF circuit DFF5 in the normal-rotation pulse request holding circuit 27 through an OR circuit OR1 and an AND circuit AND3. When the timer 13 outputs the second normal-rotation reset signal TFPWTR at the low level, the DFF circuit DFF5 is reset and the DFF circuit DFF5 is released from holding the output request signal of the normal-rotation pulse. Accordingly, when the reverse-rotation pulse request holding circuit 28 holds the output request signal of the reverse-rotation pulse, the reverse-rotation output permitting circuit 30 permits outputting the output request signal of the reverse-rotation pulse to the subsequent circuits.

The OR circuit OR1 also receives an output signal from an AND circuit AND6 in a second rotational-direction change determining circuit (SRDCD) 36. The AND circuit AND6 outputs a signal at the high level when the DFF circuit DFF5 holds the output request signal of the normal-rotation pulse after the reverse-rotation output permitting circuit 30 permits outputting the output request signal of the reverse-rotation pulse. By inputting the output signal of the AND circuit AND6 to the OR circuit OR1, the DFF circuit DFF5 is prevented from being reset by the second normal-rotation reset signal TFPWTR when the DFF circuit DFF5 holds the output request signal of the normal-rotation pulse and waits for an end of the output of the reverse-rotation pulse.

The second normal-rotation reset signal TFPWTR is also input to the normal-rotation pulse timing control circuit 37. The normal-rotation pulse timing control circuit 37 and the normal-rotation pulse outputting circuit 31 receive the output request signal of the normal-rotation pulse from the normal-rotation output permitting circuit 29. When the normal-rotation pulse timing control circuit 37 receives the second normal-rotation reset signal TFPWTR after the output request signal of the normal-rotation pulse is input, the normal-rotation pulse timing control circuit 37 outputs a timer reset signal to the timer start/reset circuit 34 so as to stop the counting operation of the timer 13.

As shown in FIG. 5, the normal-rotation pulse timing control circuit 37 includes two DFF circuits DFF10 and DFF11 coupled in series. The output request signal of the normal-rotation pulse is input to a clock terminal C of the DFF circuit DFF10. An input terminal D of the DFF10 is coupled with a pull-up power source. When the normal-rotation output permitting circuit 29 outputs the output request signal of the normal-rotation pulse, the DFF circuit DFF10 output a signal at the high level from an output terminal Q. The output terminal Q of the DFF circuit DFF10 is coupled with an input terminal D of the DFF circuit DFF11. To a clock terminal C of the DFF circuit DFF11, a clock signal CLK is input. Thus, when the output signal of the DFF circuit DFF10 transitions to the high level, an output signal of the DFF circuit DFF11 transitions from the low level to the high level in synchronization with the clock signal CLK. As described above, when the signal at the high level is input to the NOR circuit NOR3 in the normal-rotation output permitting circuit 29, the normal-rotation output permitting circuit 29 prohibits outputting the output request signal of the normal-rotation pulse.

When the second normal-rotation reset signal TFPWTR is input to the normal-rotation pulse timing control circuit 37, the second normal-rotation reset signal TFPWT is input to a reset terminal RB of the DFF circuit DFF10 through an AND circuit AND8. Then, the DFF circuit DFF10 is reset and the signal output from the output terminal Q of the DFF circuit DFF10 transitions from the high level to the low level. Accordingly, the DFF circuit DFF11 outputs a signal at the low level in synchronization with the clock signal CLK. When the signal at the low level is input to the timer start/reset circuit 34, the output signal of the timer start/reset circuit 34 transitions from the low level to the high level so as to provide the reset signal of the timer 13.

The output signal of the normal-rotation pulse timing control circuit 37 is input to an input terminal of a NOR circuit NOR5 in the timer start/reset circuit 34. To the other input terminal of the NOR circuit NOR5, the output signal of the reverse-rotation pulse request holding circuit 28 is input through an inverter INV7. The output signal of the normal-rotation pulse request holding circuit 27 is input to an inverter INV8 and an input terminal D of a DFF circuit DFF15. To a clock terminal C of the DFF circuit DFF15, the clock signal CLK is input. Thus, the DFF circuit DFF15 outputs a signal at a level of the signal input to the input terminal D in synchronization with the clock signal CLK. Output terminals of the inverter INV8 and the DFF circuit DFF15 are coupled with a NAND circuit NAND6. Thus, when the DFF circuit DFF5 is reset and the output signal of the DFF circuit DFF5 transitions from the high level to the low level, the NAND circuit NAND6 outputs a signal at the low level until the output signal of the DFF circuit DFF15 transitions to the low level in synchronization with the clock signal CLK.

At a time when the output signal of the DFF circuit DFF5 transitions from the high level to the low level by the second normal-rotation reset signal TFPWTR, that is, at a time when the output signal of the DFF circuit DFF10 in the normal-rotation pulse timing control circuit 37 transitions from the high level to the low level, the DFF circuit DFF11 still outputs the signal at the high level. Thus, the output signal of the NOR circuit NOR5 transitions to the low level. The output signals of the NOR circuits NOR5 and NOR6 are input to an OR circuit OR4. Thus, the OR circuit OR4 outputs a signal at the low level only during a time from when the output signal of the DFF circuit DFF5 transitions from the high level to the low level by the second normal-rotation reset signal TFPWTR till when the output signals of the DFF circuits DFF11 and DFF15 transition to the low level in synchronization with the clock signal CLK. By the signal at the low level output from the OR circuit OR4, the output signal of the NAND circuit NAND8 transitions from the low level to the high level. The rising signal from the low level to the high level becomes the reset signal of the timer 13 and the counting operation of the timer 13 is reset.

In the signal processing circuit 10 according to the present embodiment, there is a possibility that the DFF circuit DFF5 in the normal-rotation pulse request holding circuit 27 is reset by the second rotational-direction change determining circuit 36 at a time other than a time when the output of the normal-rotation pulse ends. Thus, by also using the signal from the normal-rotation pulse timing control circuit 37, the reset signal of the timer 13 is output at a time when the output of the normal-rotation pulse ends and the third predetermined time elapses from the time when the output of the normal-rotation pulse ends.

When the timer 13 is reset after the output of the normal-rotation pulse signal from the normal-rotation pulse outputting circuit 31 ends, the timer 13 can restart to count based on the output request signal from the normal-rotation pulse request holding circuit 27 or the reverse-rotation pulse request holding circuit 28.

When the count time reaches the second predetermined time corresponding to the pulse width of the reverse-rotation pulse, the timer 13 outputs a first reverse-rotation reset signal TRPW to the reverse-rotation pulse outputting circuit 32 so as to stop the output of the reverse-rotation pulse. Accordingly, the reverse-rotation pulse outputting circuit 32 outputs the reverse-rotation pulse having the pulse width corresponding to the second predetermined time.

The timer 13 outputs the first reverse-rotation reset signal TRPW at the low level when the count time reaches the second predetermined time. The reverse-rotation reset signal TRPW is input to a DFF circuit DFF12 through an AND circuit AND9. The POR signal is also input to the AND circuit AND9. Thus, when the timer 13 outputs the first reverse-rotation reset signal TRPW at the low level, a reset signal at the low level is input to a reset terminal RB of the DFF circuit DFF12 and the DFF circuit is reset. Accordingly, the output signal of the DFF circuit DFF12 transitions to the low level and the output of the reverse-rotation pulse ends.

The timer 13 continues to count after outputting the first reverse-rotation reset signal TRPW to the reverse-rotation pulse outputting circuit 32. When the count time after outputting the first reverse-rotation reset signal TRPW reaches the third predetermined time, the timer 13 outputs a second reverse-rotation reset signal TRPWTR to the reverse-rotation pulse request holding circuit 28 so as to reset the output request signal of the reverse-rotation pulse held by the reverse-rotation pulse request holding circuit 28.

The second reverse-rotation reset signal TRPWTR is input to the reset terminal RB of the DFF circuit DFF6 in the reverse-rotation pulse request holding circuit 28 through an OR circuit OR2 and an AND circuit AND4. When the timer 13 outputs the second reverse-rotation reset signal TFPWTR at the low level, the DFF circuit DFF6 is reset and the DFF circuit DFF6 is released from holding the output request signal of the reverse-rotation pulse. Accordingly, when the normal-rotation pulse request holding circuit 27 holds the output request signal of the normal-rotation pulse, the normal-rotation output permitting circuit 29 permits outputting the output request signal of the normal-rotation pulse to the subsequent circuits.

The OR circuit OR2 also receives an output signal from an AND circuit AND5 in a first rotational-direction change determining circuit (FRDCD) 36. The AND circuit AND5 outputs a signal at the high level when the DFF circuit DFF6 holds the output request signal of the reverse-rotation pulse after the normal-rotation output permitting circuit 29 permits outputting the output request signal of the normal-rotation pulse. By inputting the output signal of the AND circuit AND5 to the OR circuit OR2, the DFF circuit DFF6 is prevented from being reset by the second reverse-rotation reset signal TRPWTR when the DFF circuit DFF6 holds the output request signal of the reverse-rotation pulse and waits for an end of the output of the normal-rotation pulse.

The second reverse-rotation reset signal TRPWTR is also input to the reverse-rotation pulse timing control circuit 38. The reverse-rotation pulse timing control circuit 38 and the reverse-rotation pulse outputting circuit 32 receive the output request signal of the reverse-rotation pulse from the reverse-rotation output permitting circuit 30. When the reverse-rotation pulse timing control circuit 38 receives the second reverse-rotation reset signal TRPWTR after the output request signal of the normal-rotation pulse is input, the reverse-rotation Pulse timing control circuit 38 outputs a reset signal to the timer start/reset circuit 34 so as to stop the counting operation of the timer 13.

As shown in FIG. 5, the reverse-rotation pulse timing control circuit 38 includes two DFF circuits DFF13 and DFF14 coupled in series. The reverse-rotation pulse output request signal is input to a clock terminal C of the DFF circuit DFF13. An input terminal D of the DFF13 is coupled with a pull-up power source. When the reverse-rotation output permitting circuit 30 outputs the output request signal of the reverse-rotation pulse, the DFF circuit DFF13 outputs a signal at the high level from an output terminal Q. The output terminal Q of the DFF circuit DFF13 is coupled with an input terminal D of the DFF circuit DFF14. To a clock terminal C of the DFF circuit DFF14, the clock signal CLK is input. Thus, when the output signal of the DFF circuit DFF13 transitions to the high level, an output signal of the DFF circuit DFF14 transitions from the low level to the high level in synchronization with the clock signal CLK. As described above, when the signal at the high level is input to the NOR circuit NOR4 in the reverse-rotation output permitting circuit 30, the reverse-rotation output permitting circuit 30 prohibits outputting the output request signal of the reverse-rotation pulse.

When the second reverse-rotation reset signal TRPWTR is input to the reverse-rotation pulse timing control circuit 38, the second reverse-rotation reset signal TRPWTR is input to a reset terminal RB of the DFF circuit DFF13 through an AND circuit AND10. Then, the DFF circuit DFF13 is reset and the signal output from the output terminal Q of the DFF circuit DFF13 transitions from the high level to the low level. Accordingly, the DFF circuit DFF14 outputs a signal at the low level in synchronization with the clock signal CLK. When the signal at the low level is input to the timer start/reset circuit 34, the output signal of the timer start/reset circuit 34 transitions from the low level to the high level so as to provide the reset signal of the timer 13.

The output signal of the reverse-rotation pulse timing control circuit 38 is input to an input terminal of a NOR circuit NOR6 in the timer start/reset circuit 34. To the other input terminal of the NOR circuit NOR6, the output signal of the normal-rotation pulse request holding circuit 27 is input through an inverter INV9. The output signal of the reverse-rotation pulse request holding circuit 28 is input to an inverter INV10 and an input terminal D of a DFF circuit DFF16. To a clock terminal C of the DFF circuit DFF16, the clock signal CLK is input. Thus, the DFF circuit DFF16 outputs a signal at a level of the signal input to the input terminal D in synchronization with the clock signal CLK. Output terminals of the inverter INV10 and the DFF circuit DFF16 are coupled with a NAND circuit NAND7. Thus, when the DFF circuit DFF6 is reset and the output signal of the DFF circuit DFF5 transitions from the high level to the low level, the NAND circuit NAND7 outputs a signal at the low level until the output signal of the DFF circuit DFF16 transitions to the low level in synchronization with the clock signal CLK.

At a time when the output signal of the DFF circuit DFF6 transitions from the high level to the low level by the second reverse-rotation reset signal TRPWTR, that is, at a time when the output signal of the DFF circuit DFF13 in the reverse-rotation pulse timing control circuit 38 transitions from the high level to the low level, the DFF circuit DFF14 still outputs the signal at the high level. Thus, the output signal of the NOR circuit NOR6 transitions to the low level. The output signals of the NOR circuits NOR6 and NOR7 are input to an OR circuit OR5. Thus, the OR circuit OR5 outputs a signal at the low level only during a time from when the output signal of the DFF circuit DFF6 transitions from the high level to the low level by the second reverse-rotation reset signal TRPWTR till when the output signals of the DFF circuits DFF14 and DFF16 transition to the low level in synchronization with the clock signal CLK. By the signal at the low level output from the OR circuit OR5, the output signal of the NAND circuit NAND8 transitions from the low level to the high level. The rising signal from the low level to the high level becomes the reset signal of the timer 13 and the counting operation of the timer 13 is reset.

In the signal processing circuit 10 according to the present embodiment, there is a possibility that the DFF circuit DFF6 in the reverse-rotation pulse request holding circuit 28 is reset by the first rotational-direction change determining circuit 35 at a time other than a time when the output of the reverse-rotation pulse ends. Thus, by also using the signal from the reverse-rotation pulse timing control circuit 38, the reset signal of the timer 13 is output at a time when the output of the reverse-rotation pulse ends and the third predetermined time elapses from the time when the output of the reverse-rotation pulse ends.

When the timer 13 is reset after the output of the reverse-rotation pulse signal from the reverse-rotation pulse outputting circuit 32 ends, the timer 13 can restart to count based on the output request signal from the normal-rotation pulse request holding circuit 27 or the reverse-rotation pulse request holding circuit 28.

As described above, in the signal processing circuit 10 according to the present embodiment, when the rotational direction of the rotor changes from the normal direction to the reverse direction while the normal-rotation pulse is being output, the change in the first sensor signal after the change of the rotational direction is not masked. In a case where the change in the first sensor signal is caused by the effective edge, the output request signal of the reverse-rotation pulse generated by the effective edge is held by the reverse-rotation pulse request holding circuit 28. Then, when the output request signal of the normal-rotation pulse held by the normal-rotation pulse request holding circuit 27 is reset based on the counting operation of the timer 13, the reverse-rotation output permitting circuit 30 permits outputting the output request signal held by the reverse-rotation pulse request holding circuit 28 to the reverse-rotation pulse outputting circuit 32.

Thus, when the rotational direction of the rotor changes from the normal direction to the reverse direction, the reverse-rotation pulse is output after the normal-rotation pulse. In contrast, when the rotational direction of the rotor changes from the reverse direction to the normal direction, the normal-rotation pulse is output after the reverse-rotation pulse. Thus, even in a case where the rotational direction of the rotor changes with a short period, the output combining circuit 33 can output the detection signal that accurately indicates the rotational motion of the rotor.

However, when the following conditions are satisfied, the first rotational-direction change determining circuit 35 and the second rotational-direction change determining circuit 36 reset the output request signal of the normal-rotation pulse or the reverse-rotation pulse that is opposite from the normal-rotation pulse or the reverse-rotation pulse being output.

For example, in a case where the normal-rotation pulse request holding circuit 27 holds the output request signal of the normal-rotation pulse, the reverse-rotation pulse request holding circuit 28 holds the output request signal of the reverse-rotation pulse, and the output request signal of the normal-rotation pulse is output from the normal-rotation effective edge determining circuit 25 while the normal-rotation pulse is being output, the rotational direction of the rotor changes from the normal direction to the reverse direction, and then from the reverse direction to the normal direction. In a case where the rotational direction of the rotor changes even number of times (for example, two times) while the normal-rotation pulse request holding circuit 27 holds the output request signal of the normal-rotation pulse, the normal-rotation pulse being output as the detection signal corresponds to the rotational direction of the rotor. If the reverse-rotation pulse is output after the normal-rotation pulse when the rotational direction of the rotor further changes to the reverse direction, a time lag may generate between the actual rotational motion of the rotor and the detection signal, and thereby an output of the normal-rotation pulse or the reverse-rotation pulse that should be output thereafter may be late.

Thus, the signal processing circuit 10 according to the present embodiment includes the first rotational-direction change determining circuit 35 and the second rotational-direction change determining circuit 36. When the reverse-rotation pulse request holding circuit 28 holds the output request signal of the reverse-rotation pulse after the output request signal of the normal-rotation pulse is output from the normal-rotation output permitting circuit 29, and then the output request signal of the normal rotation pulse is output from the normal-rotation effective edge determining circuit 25, the first rotational-direction change determining circuit 35 outputs the reset signal so as to reset the output request signal held by the reverse-rotation pulse request holding circuit 28. In other words, when the first rotational-direction change determining circuit 35 determines that the rotational direction of the rotor changes two times, that is, from the normal direction to the reverse direction, and then from the reverse direction to the normal direction, the first rotational-direction change determining circuit 35 outputs the reset signal to the reverse-rotation pulse request holding circuit 28.

The first rotational-direction change determining circuit 35 includes a DFF circuit DFF7, the AND circuit AND5, and a NAND circuit NAND4. To a clock terminal C of the DFF circuit DFF7, the output request signal of the normal-rotation pulse is input. A reset terminal RB of the DFF circuit DFF7 is coupled with a pull-up power source. To a reset terminal RB of the DFF circuit DFF7, the reset signal is input similarly to the DFF circuit DFF5. When the output request signal of the normal-rotation pulse is output from the normal-rotation output permitting circuit 29, the DFF circuit DFF7 reads a signal that is input from the pull-up power source to an input terminal D and outputs a signal at the level (high level) of the reading signal. The AND circuit AND5 receives the output signals from the DFF circuit DFF7 and the reverse-rotation pulse request holding circuit 28. The output signal of the AND circuit AND5 transitions to the high level when the normal-rotation output permitting circuit 29 outputs the output request signal of the normal-rotation pulse, and the reverse-rotation pulse request holding circuit 28 holds the output request signal of the reverse-rotation pulse while the normal-rotation pulse outputting circuit 31 is outputting the normal-rotation pulse. The NAND circuit NAND4 receives the output signals from the AND circuit AND5 and the normal-rotation effective edge determining circuit 25. Thus, when the normal-rotation effective edge determining circuit 25 outputs the output request signal of the normal-rotation pulse while the output signal of the AND circuit AND5 is at the high level, the output signal of the NAND circuit NAND4 transitions to the low level.

The output signal of the NAND circuit NAND4 is input to the AND circuit AND4 that outputs the reset signal to the DFF circuit DFF6 in the reverse-rotation pulse request holding circuit 28. Thus, when the NAND circuit NAND4 outputs the signal at the low level, the DFF circuit DFF6 is reset and the reverse-rotation pulse request circuit 28 is released from holding the output request signal of the reverse-rotation pulse.

When the normal-rotation pulse request holding circuit 27 holds the output request signal of the normal-rotation pulse after the output request signal of the reverse-rotation pulse is output from the reverse-rotation output permitting circuit 30, and then the output request signal of the reverse-rotation pulse is output from the reverse-rotation effective edge determining circuit 26, the second rotational-direction change determining circuit 36 outputs the reset signal so as to reset the output request signal held by the normal-rotation pulse request holding circuit 28. In other words, when the second rotational-direction change determining circuit 36 determines that the rotational direction of the rotor changes two times, that is, from the reverse direction to the normal direction, and then from the normal direction to the reverse direction, the second rotational-direction change determining circuit 35 outputs the reset signal to the normal-rotation pulse request holding circuit 27.

The second rotational-direction change determining circuit 36 includes a DFF circuit DFF8, the AND circuit AND6, and a NAND circuit NAND5. To a clock terminal C of the DFF circuit DFF8, the output request signal of the reverse-rotation pulse is input. A reset terminal RB of the DFF circuit DFF8 is coupled with a pull-up power source. To a reset terminal RB of the DFF circuit DFF8, the reset signal is input similarly to the DFF circuit DFF6. When the output request signal of the reverse-rotation pulse is output from the reverse-rotation output permitting circuit 30, the DFF circuit DFF8 reads a signal that is input from the pull-up power source to an input terminal D and outputs a signal at the level of the reading signal. The AND circuit AND6 receives the output signals from the DFF circuit DFF8 and the normal-rotation pulse request holding circuit 27. The output signal of the AND circuit AND6 transitions to the high level when the reverse-rotation output permitting circuit 30 outputs the output request signal of the reverse-rotation pulse, and the normal-rotation pulse request holding circuit 27 holds the output request signal of the normal-rotation pulse while the reverse-rotation pulse outputting circuit 32 is outputting the reverse-rotation pulse. The NAND circuit NAND5 receives the output signals from the AND circuit AND6 and the normal-rotation effective edge determining circuit 26. Thus, when the reverse-rotation effective edge determining circuit 26 outputs the output request signal of the reverse-rotation pulse while the output signal of the AND circuit AND6 is at the high level, the output signal of the NAND circuit NAND5 transitions to the low level.

The output signal of the NAND circuit NAND5 is input to the AND circuit AND3 that outputs the reset signal to the DFF circuit DFF5 in the normal-rotation pulse request holding circuit 28. Thus, when the NAND circuit NAND5 outputs the signal at the low level, the DFF circuit DFF5 is reset and the normal-rotation pulse request holding circuit 28 is released from holding the output request signal of the normal-rotation pulse.

Because the logic circuit 20 according to the present embodiment includes the first rotational-direction change determining circuit 35 and the second rotational-direction change determining circuit 36, the logic circuit 20 can output the detection signal that includes the normal-rotation pulse or the reverse-rotation pulse whose time lag with the actual rotational motion of the rotor is restricted.

In a case where the rotational direction of the rotor changes even number of times, the logic circuit 20 according to the present embodiment resets the output request signal of the normal-rotation pulse or the reverse-rotation pulse that is opposite from the normal-rotation pulse and the reverse-rotation pulse being output. Thus, even when a noise signal is applied and a chattering generates in the first sensor signal, the logic circuit 20 can output the detection signal that is not affected by the noise signal. This is because even if a chattering is caused by a noise signal and the first sensor signal returns to an original state when the noise signal disappears, the logic circuit 20 determines that the rotational direction of the rotor successively changes even number of times.

Figure 6:
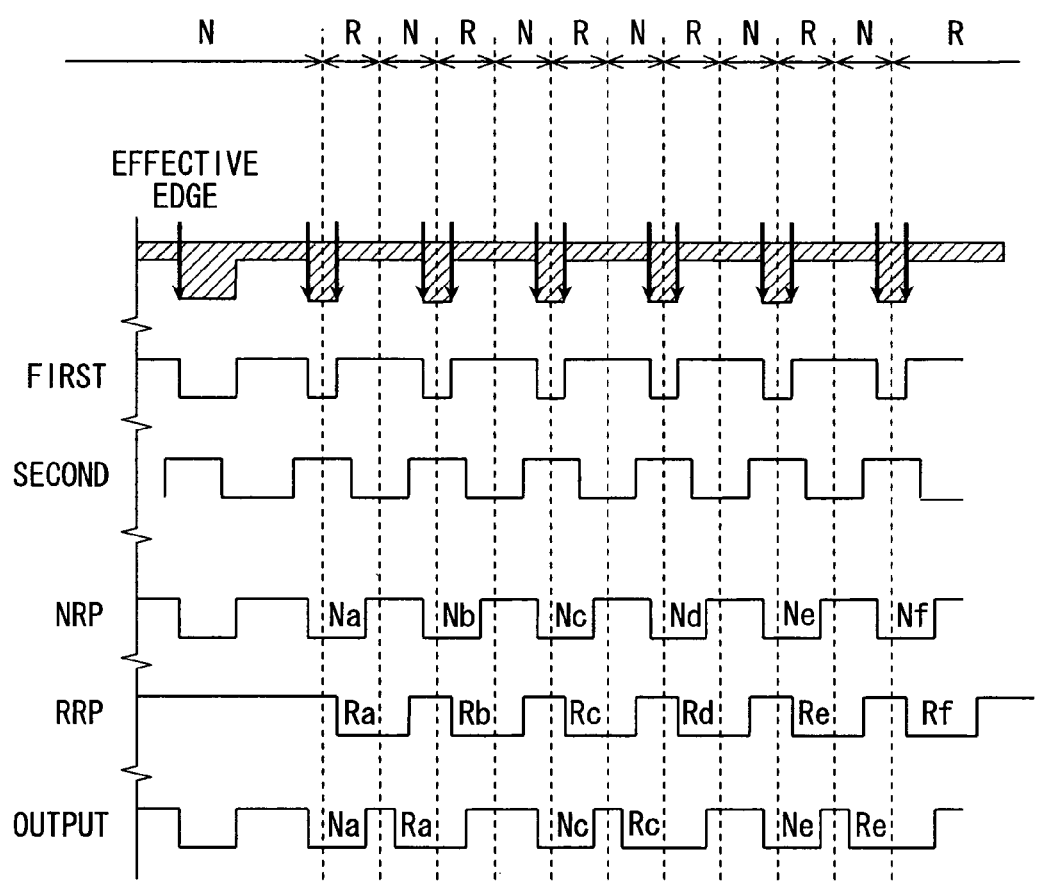
FIG. 6 is a timing diagram showing signals processed in the logic circuit according to the first embodiment.

The timing chart in FIG. 6 shows an example where the rotational direction of the rotor that is rotating in the normal direction successively changes between the normal direction (N) and the reverse direction (R) with a short period.

When the effective edge is detected while the rotor is rotating in the normal direction, the output request signal of the normal-rotation pulse (NRP) Na is output, and thereby the signal processing circuit 10 outputs a normal-rotation pulse Na. When the output request signal of the reverse-rotation pulse (RRP) Ra generates while the normal-rotation pulse Na is being output, a reverse-rotation pulse Ra is not output immediately. The output request signal is held by the reverse-rotation pulse request holding circuit 28 and the signal processing circuit 10 waits the output of the reverse-rotation pulse Ra until the output of the normal-rotation pulse Na ends.

When the output of the normal-rotation pulse Na ends and the adjusting time for securing an interval between pulse signals elapses after the output of the normal-rotation pulse Na ends, the reverse-rotation pulse Ra is output based on the output request signal held by the reverse-rotation pulse request holding circuit 28.

When an output request signal of a normal-rotation pulse Nb is held by the normal-rotation pulse request holding circuit 27, and then an output request signal of a reverse-rotation pulse Rb generates in a state where the reverse-rotation pulse Ra is being output or during an adjusting time after the output of the reverse-rotation pulse Ra ends, the output request signal of the normal-rotation pulse Nb held by the normal-rotation pulse request holding circuit 27 is reset. Thus, the signal processing circuit 10 can restrict a time lag between the detection signal and the actual rotational motion of the rotor.

Even when the reverse-rotation effective edge determining circuit 26 outputs the output request signal of the reverse-rotation pulse Rb, the reverse-rotation pulse request holding circuit 28, which already holds the output request signal of the reverse-rotation pulse Ra, keeps holding the output request signal of the reverse-rotation pulse Ra. That is, the reverse-rotation pulse request holding circuit 28 keeps holding the output request signal of the reverse-rotation pulse Ra without being influenced by the generation of the output request signal of the new reverse-rotation pulse Rb. In the present case, only the rotational direction of the rotor changes two times, that is, from the reverse direction to the normal direction, and then from the normal direction to the reverse direction, and the positions of the gear teeth do not change. Thus, if the signal processing circuit 10 outputs the reverse-rotation pulse Rb based on the output request signal of the reverse-rotation pulse Rb, the positions of the gear teeth may be detected inaccurately due to the reverse-rotation pulse included in the detection signal.

Therefore, in the signal processing circuit 10 according to the present embodiment, even when the output request signal of the normal-rotation pulse Nb and the output request signal of the reverse-rotation pulse Rb generates in a state where the reverse-rotation pulse Ra is being output, the normal-rotation pulse Nb and the reverse-rotation pulse Rb are not output. As long as the rotational direction of the rotor changes with a short period, the signal processing circuit 10 successively executes the above-described signal process.

Second Embodiment

Figure 7:
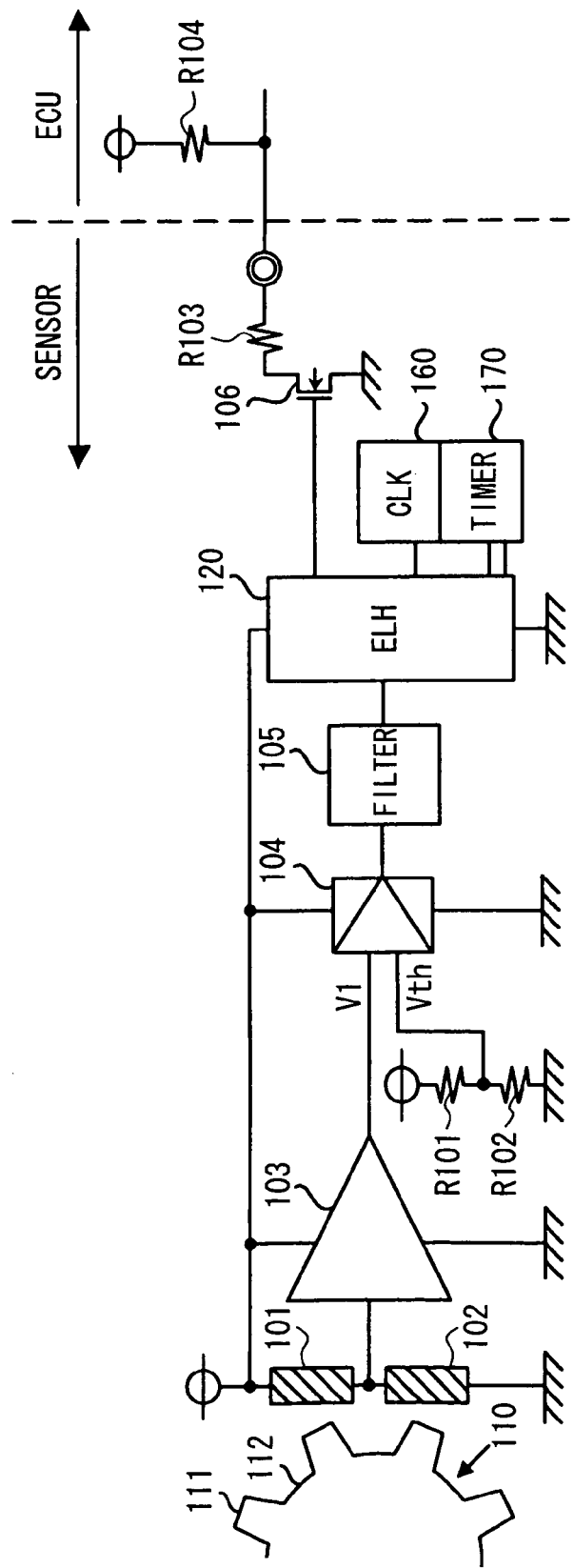
FIG. 7 is a block diagram showing a crank angle sensor according to a second embodiment of the present invention.

A rotation angle sensor according to a second embodiment of the present invention will now be described. The rotation angle sensor according to the present embodiment can be applied, for example, to a crank angle sensor for detecting a crank angle of an engine. The crank angle sensor according to the present embodiment will be described with reference to FIG. 7.

The crank angle sensor includes magnetic sensors 101 and 102, an amplifier 103, a comparator 104, a filter circuit 105, an N type metal-oxide-semiconductor field-effect transistor (MOSFET) 106, an edge level holding circuit (ELH) 120, a clock generating circuit (CLK) 160, a timer circuit 170, and resistors R101 to R104. A rotor 110 is fixed in a crankshaft of an engine. The rotor 110 has top lands 111 and bottom lands 112 alternately provided along an outer periphery. The top lands and the bottom lands are made of magnetic material. The magnetic sensors 101 and 102 may be magnetic resistant elements, for example. The magnetic sensors 101 and 102 are opposite the outer periphery of the rotor 110 so that the magnetic sensors 101 and 102 can detect passage of the top lands 111 and the bottom lands 112.

The edge level holding circuit 120 is coupled with an output side of the filter circuit 105. The edge level holding circuit 120 detects an edge level of the pulse signal passing through the filter circuit 105. In the detected edge levels, the edge level holding circuit 120 holds only the first edge level in a half period of the pulse signal passing through the filter circuit 105 for a predetermined time. The pulse signal passing through the filter circuit 105 corresponds to analog detection signals that are periodically output from the magnetic sensors 101 and 102. Thus, the edge level holding circuit 120 holds only the first edge level of the pulse signal corresponding to a half period of the analog detection signals output from the magnetic sensors 101 and 102.

After the predetermined time elapses, the edge level holding circuit 120 outputs the pulse signal that has the edge level held by the edge level holding circuit 120 to the N type MOSFET 106. The clock generating circuit 160 and the timer circuit 170 are coupled with the edge level holding circuit 120. The clock generating circuit 160 generates a clock signal that becomes a reference when the edge level holding circuit 120 executes various professes and a clock signal that becomes a reference of a count time of the timer circuit 170. The timer circuit 170 counts a holding time when the edge level holding circuit 120 holds the edge level and a waiting time when the edge level holding circuit 120 waits for outputting the pulse signal that has the edge level held by the edge level holding circuit 120.

The holding time and the waiting time counted by the timer circuit 170 can be changes in accordance with a product specification of an engine in which the crank angle sensor is disposed. A P type MOSFET or a bipolar transistor may also be used as an outputting transistor instead of the N type MOSFET 106.

Figure 8:
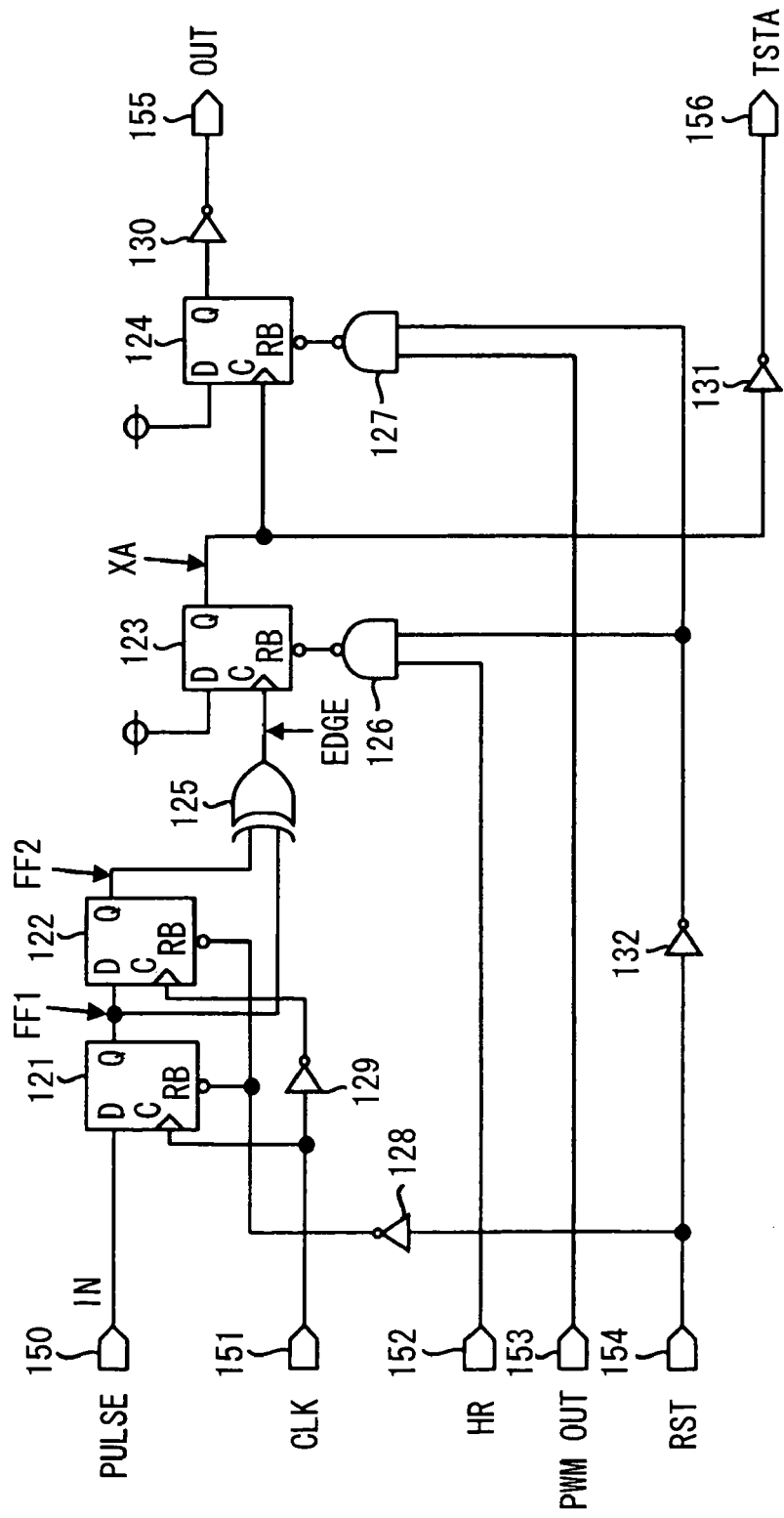
FIG. 8 is a circuit diagram showing an edge level holding circuit according the second embodiment.

As shown in FIG. 8, the edge level holding circuit 120 includes five input terminals 150 to 154, four DFF circuits 121 to 124, an EXOR circuit 125, two NAND circuits 126 and 127, five NOT circuits 128 to 132, and two output terminals 155 and 156.

The input terminal 150 is coupled with an output terminal of the filter circuit 105 and receives the pulse signal output from the filter circuit 105. A time constant of the filter circuit 105 is equivalent to two periods of the clock signal generated by the clock generating circuit 160. Thus, the pulse signal (IN) output from the filter circuit 105 has a pulse width greater than or equal to two periods of the clock signal.

The input terminal 151 is coupled with an output terminal of the clock generating circuit 160 and receives the clock signal output from the clock generating circuit 160. The input terminals 152 and 153 are coupled with an output terminal of the timer, circuit 170. The input terminal 152 receives a signal that indicates that the count time of the timer circuit 170 reaches the predetermined holding time. The input terminal 153 receives a signal that indicates that the count time of the timer circuit 170 reaches the predetermined waiting time. The input terminal 154 receives a reset signal output from a reset circuit (not shown) such as a power on reset circuit.

The input terminal 150 is coupled with an input terminal D of the DFF circuit 121. The input terminal 151 is coupled with a clock terminal C of the DFF circuit 121. In addition, the input terminal 151 is coupled with a clock terminal C of the DFF circuit 122 through the NOT circuit 129. The input terminal 152 is coupled with an input terminal of the NAND circuit 126. The input terminal 153 is coupled with an input terminal of the NAND circuit 127. The input terminal 154 is coupled with each reset-bar terminal RB of the DFF circuits 121 and 122 through the NOT circuit 128. In addition, the input terminal 154 is coupled with each of the other input terminals of the NAND circuits 126 and 127 through the NOT circuit 132.

An output terminal Q of the DFF circuit 121 is coupled with an input terminal D of the DFF circuit 122. Each of the output terminals Q of the DFF circuits 121 and 122 is coupled with an input terminal of the EXOR circuit 125. An output terminal of the EXOR circuit 125 is coupled with a clock terminal C of the DFF circuit 123. An output terminal Q of the DFF circuit 123 is coupled with a clock terminal C of the DFF circuit 124. In addition, the output terminal Q of the DFF circuit 123 is coupled with the output terminal 156 through the NOT circuit 131. The output terminal 156 is coupled with the timer circuit 170.

An output terminal Q of the DFF circuit 124 is coupled with the output terminal 155 through the NOT circuit 130. The output terminal 155 is coupled with the N type MOSFET 106 that can function as the outputting transistor. A reset-bar terminal RB of the DFF circuit 123 is coupled with an output terminal of the NAND circuit 126. A reset-bar terminal RB of the DFF circuit 124 is coupled with an output terminal of the NAND circuit 127.

The DFF circuit 121 and 122 and the EXOR circuit 125 detect an edge-level changing time when the edge level of the pulse signal input to the input terminal 150 changes. In the edge levels that change at the edge-level changing times, the DFF circuit 123 holds only the first edge level that changes in the half period of the input pulse signal until the holding time elapses.

The DFF circuit 123 keeps holding the edge level even when another edge level change is detected during the holding time. That is, while the DFF circuit 123 holds the edge level, the DFF circuit 123 does not receive, that is, ignores another edge level.

When the waiting time elapses, the DFF circuit 124 generates a pulse signal. The pulse signal generated by the DFF circuit 124 has an edge level same as the edge level held by the DFF circuit 123 and has a pulse width same as a pulse width of the pulse signal that is input to the input terminal 150 and is not affected by a noise signal. The DFF circuit 124 outputs the pulse signal to the output terminal 155 through the NOT circuit 130. The pulse width of the pulse signal is determined based on a pitch of the top lands 111 of the rotor 110 and is changed in accordance with the product specification of the engine in which the crank angle sensor is disposed. When the holding time elapses after the DFF circuit 124 outputs the pulse signal, the DFF circuit 123 becomes a state where the DFF circuit 123 can hold a next edge level.

Figure 9:
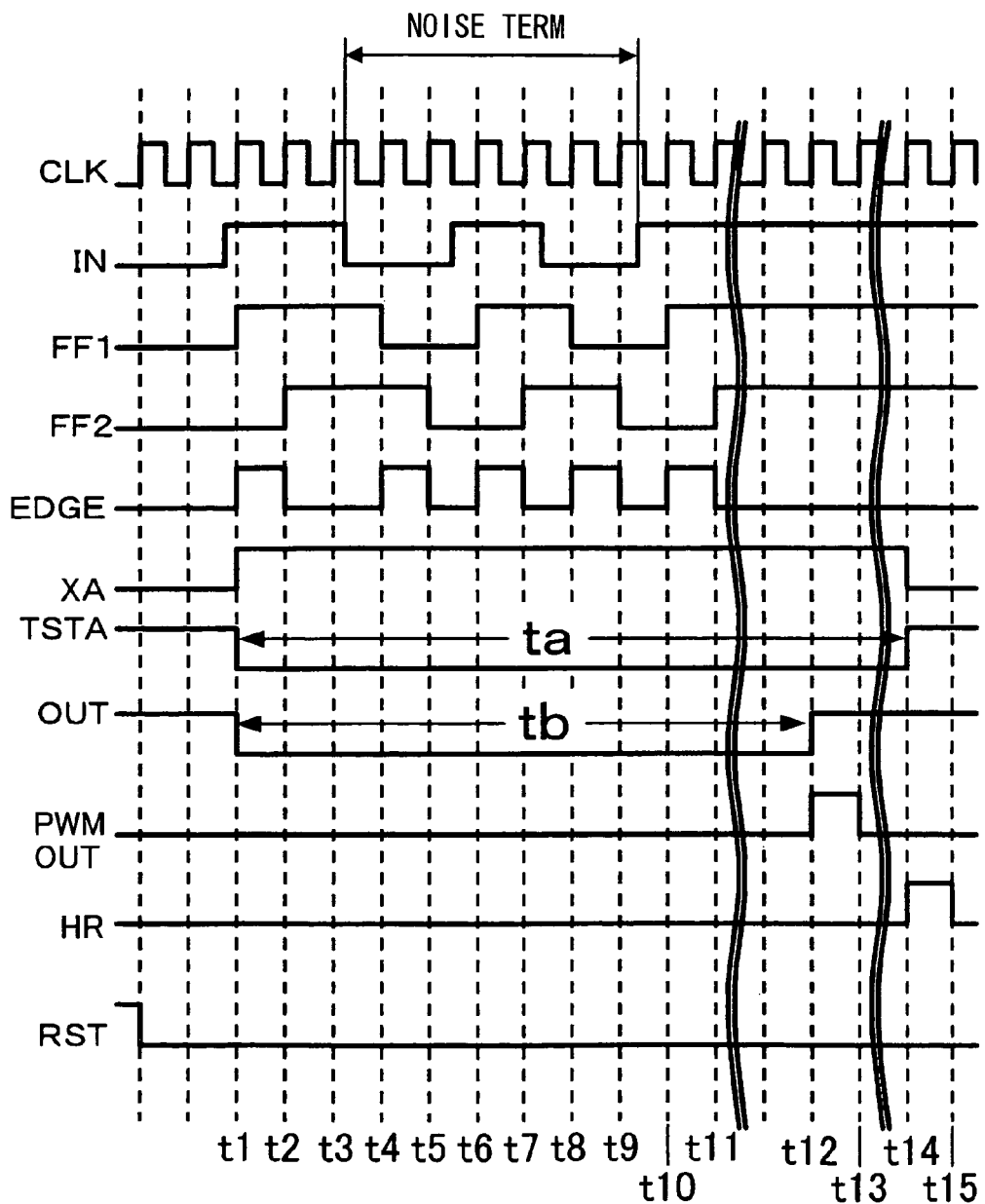
FIG. 9 is a timing diagram showing signals that generate at various points in the edge level holding circuit according the second embodiment.

An exemplary operation of the crank angle sensor will now be described. A timing chart in FIG. 9 shows signals generated at various points in the edge level holding circuit 120.

When the rotor 110 rotates with a rotation of the crankshaft and the top lands 111 and the bottom lands 112 pass in front of the magnetic sensors 101 and 102, magnetic resistances of the magnetic sensors 101 and 102 periodically changes with the passage of the top lands 111 and the bottom lands 112. The magnetic sensors 101 and 102 periodically output analog signals to the amplifier 103 in accordance with the change in the magnetic resistances. The amplifier 103 amplifiers the analog signals output from the magnetic sensors 101 and 102 with a predetermined amplification factor. The amplified signal output from the amplifier 103 is input to the comparator 104. The comparator 104 compares a voltage V1 of the amplified signal and a threshold voltage Vth that generates at a middle point between a split resistor R101 and a split resistor R102, and outputs a pulse signal (binarized signal) in accordance with a comparison result.

The pulse signal from the comparator 104 is input to the filter circuit 105. The filter circuit 105 removes noise component in the pulse signal to a certain degree. The filter circuit 105 may be, for example, a low pass filter such as a CR filter circuit or a high pass filter. The pulse signal output from the filter circuit 105 is input to the input terminal D of the DFF circuit 121 through the input terminal 150 of the edge level holding circuit 120. When the input signal (IN) input to the input terminal D transitions to a high level, the DFF circuit 121 outputs a high level signal from the output terminal Q at a time t1 when the clock signal (CLK) input to the clock terminal C transitions to a high level as shown by FF1 in FIG. 9.

The high level signal output from the DFF circuit 121 is input to the input terminal D of the DFF circuit 122 and the EXOR circuit 125. At a time when the high level signal is input to the input terminal D of the DFF circuit 122, the clock signal input to the clock terminal C is at a low level. Thus, the DFF circuit 122 outputs a low level signal from the output terminal Q as shown by FF2 in FIG. 9.

Because input signals of the EXOR circuit 125 are the high level "1" and the low level "0," the EXOR circuit 125 outputs a high level signal at the time t1 as shown by EDGE in FIG. 9. Thus, the EXOR circuit 125 detects a time when the pulse signal input to the input terminal 150 transitions from the low level to the high level.

The high level signal output from the EXOR circuit 125 is input to the clock terminal C of the DFF circuit 123. The input terminal D of the DFF circuit 123 is coupled with a power source and is continuously applied with a high level signal. Thus, when the high level signal is input to the clock terminal C, the DFF circuit 123 outputs a high level signal from the output terminal Q as shown by XA in FIG. 9.

During the holding time "ta" from when the EXOR circuit 125 outputs the high level signal till when the reset signal at the low level is input to the reset-bar terminal RB, the DFF circuit 123 continuously outputs the high level signal from the output terminal Q. That is, the DFF circuit 123 holds the high level at a time when the pulse signal input to the input terminal 150 transitions from the low level to the high level as the edge level until the holding time "ta" elapses.

An example where the pulse signal input to the input terminal 150 is affected by a noise signal will now be described. In FIG. 9, a term when the pulse signal changes by being affected by the noise signal is shown as a noise term. During the noise term, although the pulse signal should be keep the high level, the pulse signal changes from the high level to the low level two times by being affected by the noise signal.

The DFF circuits 121 and 122 process the pulse signal affected by the noise signal same as a normal pulse signal. Thus, the DFF circuits 121 and 122 output the signals in accordance with level changes, caused by the noise signal. The EXOR circuit 125 also output the signal in accordance with the level changes caused by the noise signal. However, because the high level signal is continuously input to the input terminal D of the DFF circuit 123, the DFF circuit 123 continuously outputs the high level signal from the output terminal Q regardless of an input level of the clock terminal C until the reset signal RST is input to the reset-bar terminal RB.

That is, even when the level of the pulse signal input to the input terminal 150 changes by being affected by a noise signal, the DFF circuit 123 ignores the level change. The DFF circuit 123 can hold the edge level (high level) at the time when the pulse signal transitions from the low level to the high level for the first time in the half period until the holding time "ta" from the time t1 to a time t14 elapses.

The high level signal output from the output terminal Q of the DFF circuit 123 is input to the clock terminal C of the DFF circuit 124. The input terminal D of the DFF circuit 124 is also coupled with the power source and is continuously applied with a high level signal. Thus, when the high level signal is input from the DFF circuit 123 to the clock terminal C, the DFF circuit 124 outputs a high level signal from the output terminal Q. The high level signal output from the DFF circuit 124 is changed into a low level signal by the NOT circuit 130 and is input to the N type MOSFET 106 through the output terminal 155.

The high level signal output from the output terminal Q of the DFF circuit 123 is changed into a low level signal by the NOT circuit 131 and is input to the timer circuit 170 through the output terminal 156. When the timer circuit 170 receives the low level signal, the timer circuit 170 starts to count the holding time "ta" and a waiting time "tb." The holding time "ta" is set to be shorter than a time when the magnetic sensor 101 and 102 correspond to a pitch of the top lands 111 formed in the rotor 110. In other words, the holding time "ta" is within a time from when the first edge level is detected by the edge holding circuit 120 till when a next half period of the analog signals start. In a case where the noise term can be specified, the above-described time can be set to be longer than at least the noise term and shorter than the time corresponding to the pitch.

The holding time "ta" is set to be longer than the waiting time "tb" so that the signal affected by a noise signal is not output to the ECU during the waiting time "tb." That is, by setting the waiting time "tb" to be shorter than the holding time "ta," the pulse signal having the level same as the edge level held by the DFF circuit 123 can be certainly output from the DFF circuit 124 before the holding time "ta" elapses.

At a time t12 when the count time of the timer circuit 170 reaches the waiting time "tb," the high level signal is output from the timer circuit 170 to the input terminal 153 as shown by PWM OUT in FIG. 9. Then, the output signal of the NAND circuit 127 transitions to the low level, the DFF circuit 124 is reset, and the output signal from the output terminal Q of the DFF circuit 124 transitions to the low level. Accordingly, the output signal of the output terminal 155 transitions to the high level at the time t12 as shown by OUT in FIG. 9.

At the time t14 when the count time of the timer circuit 170 reaches the holding time "ta," the high level signal is output from the timer circuit 170 to the input terminal 152 as shown by HR in FIG. 9. Then, the output signal of the NAND circuit 126 transitions to the high level, the DFF circuit 123 is reset, and the signal output from the output terminal Q of the DFF circuit 123 transitions to the low level as shown by XA in FIG. 9. In addition, the output signal of the output terminal 156 transitions to the high level at the time t14 as shown by TSTA in FIG. 9, and the timer circuit 170 is reset.

When the pulse signal input to the input terminal 150 transitions from the high level to the low level in the next half period, the high level at the time when the edge level of the pulse signal changes is held by the DFF circuit 123 for the holding time "ta." When the count time reaches the waiting time "tb" during the holding time "ta," the DFF circuit 124 outputs the high level signal.

The edge level holding circuit 120 repeats the above-described process to the pulse signal input to the input terminal 150. The ECU calculates the intervals of the high level signals input to the ECU, calculates a rotation angle of the rotor 110 based on the calculated result, and calculates the crank angle based on the rotation angle of the rotor 110.

Even when the pulse signal output from the filter circuit 105 is affected by a noise signal and thereby the level of the pulse signal changes, the crank angle sensor according to the present embodiment does not transmit the level change caused by the noise signal to the ECU. Thus, the ECU can calculate the crank angle with a high degree of accuracy.

Third Embodiment

A rotation angle sensor according to a third embodiment of the present invention will now be described. The rotation angle sensor according to the present embodiment can be applied, for example, to a crank angle sensor. The crank angle sensor according to the present embodiment can continuously output a same level signal from a changing time of the top land 111 and the bottom land 112 of the rotor 110 till the next changing time. An edge level holding circuit 120 in the crank angle sensor according to the present embodiment will be described with reference to FIG. 10 and FIG. 11. The other components of the crank angle sensor according to the present embodiment may be similar to those of the crank angle sensor according to the second embodiment.

Figure 10:
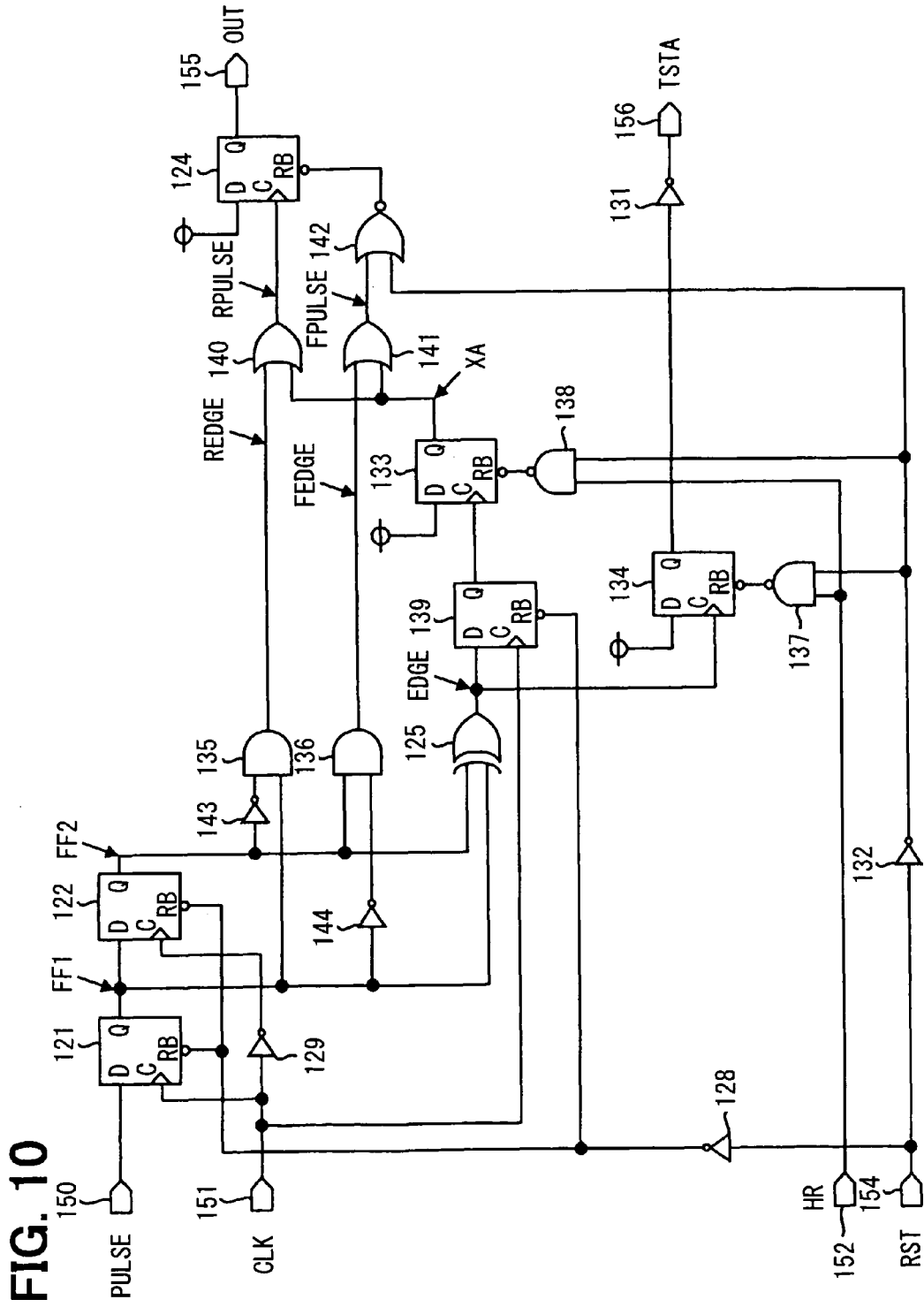
FIG. 10 is a circuit diagram showing an edge level holding circuit in a crank angle sensor according a third embodiment of the present invention.

As shown in FIG. 10, the edge level holding circuit 120 according to the present embodiment includes four input terminals 150, 151, 152, and 154, six DFF circuits 121, 122, 124, 133, 134, and 139, two AND circuits 135 and 136, two NAND circuits 137 and 138, two OR circuits 140 and 141, an EXOR circuit 125, a NOR circuit 142, six NOT circuits 128, 129, 131, 132, 143, 144, and two output terminals 155 and 156.

The pulse signal PULSE output from the filter circuit 105 is input to the input terminal 150. The input terminal 150 is coupled with an input terminal D of the DFF circuit 121. The clock signal CLK output from the clock generating circuit 160 is input to the input terminal 151. The input terminal 151 is coupled with a clock terminal C of the DFF circuit 121. In addition, the input terminal 151 is coupled with a clock terminal C of the DFF circuit 122 through the NOT circuit 129.

An output terminal Q of the DFF circuit 121 is coupled with an input terminal D of the DFF circuit 122. The output terminal Q of the DFF circuit 121 is also coupled with one input terminal of each of the AND circuits 135 and 136 and the EXOR circuit 125. An output terminal Q of the DFF circuit 122 is coupled with the other input terminal of the AND circuit through the NOT circuit 143, the other input terminal of the AND circuit 136 through the NOR circuit 144, and the other input terminal of the EXOR circuit 125.

An output terminal of the EXOR circuit 125 is coupled with an input terminal D of the DFF circuit 139. A clock terminal C of the DFF circuit 139 is coupled with the input terminal 151. An output terminal Q of the DFF circuit 139 is coupled with a clock terminal C of the DFF circuit 133. An output terminal Q of the DFF circuit 133 is coupled with one input terminal of each of the OR circuits 140 and 141. An output terminal of the AND circuit 135 is coupled with the other input terminal of the OR circuit 140. An output terminal of the AND circuit 136 is coupled with the other input terminal of the OR circuit 141.

An output terminal of the OR circuit 141 is coupled with one input terminal of the NOR circuit 142. An output terminal of the NOR circuit 142 is coupled with a reset-bar terminal RB of the DFF circuit 124. An output terminal of the OR circuit 140 is coupled with a clock terminal C of the DFF circuit 124. An output terminal Q of the DFF circuit 124 is coupled with the output terminal 155.

An output terminal of the EXOR circuit 125 is coupled with a clock terminal C of the DFF circuit 134. An output terminal Q of the DFF circuit 134 is coupled with the output terminal 156 through the NOT circuit 131. The output terminal 156 is coupled with the timer circuit 170. Each of the input terminals 152 and 154 is coupled with one input terminal of the NAND circuit 137 and one input terminal of the NAND circuit 138.

The input terminal 154 is also coupled with a reset-bar terminal RB of each of the DFF circuits 121, 122, and 139. Furthermore, the input terminal 154 is coupled with the other input terminal of each of the NAND circuits 137 and 138 and the NOR circuit 142 through the NOT circuit 132. An output terminal of the NAND circuit 137 is coupled with a reset-bar terminal RB of the DFF circuit 134. An output terminal of the NAND circuit 138 is coupled with a reset-bar terminal RB of the DFF circuit 133.

An exemplary operation of the crank angle sensor according to the present embodiment will now be described. A timing chart in FIG. 11 shows signals generated at various points in the edge level holding circuit 120.

The pulse signal output from the filter circuit 105 is input to the input terminal D of the DFF circuit 121 through the input terminal 150 of the edge level holding circuit 120. When the input signal IN input to the input terminal D transitions to the high level, the DFF circuit 121 outputs a high level signal from the output terminal Q at a time t1 when the clock signal CLK input to the clock terminal C transitions to the high level as shown, by FF1 in FIG. 11.

The high level signal output from the DFF circuit 121 is input to the input terminal D of the DFF circuit 122, the AND circuits 135 and 136, and the EXOR circuit 125. At a time when the high level signal is input to the input terminal D of the DFF circuit 122, the clock signal input to the clock terminal C is at the low level. Thus, the DFF circuit 122 outputs a low level signal from the output terminal Q as shown by FF2 in FIG. 11.

Figure 11:
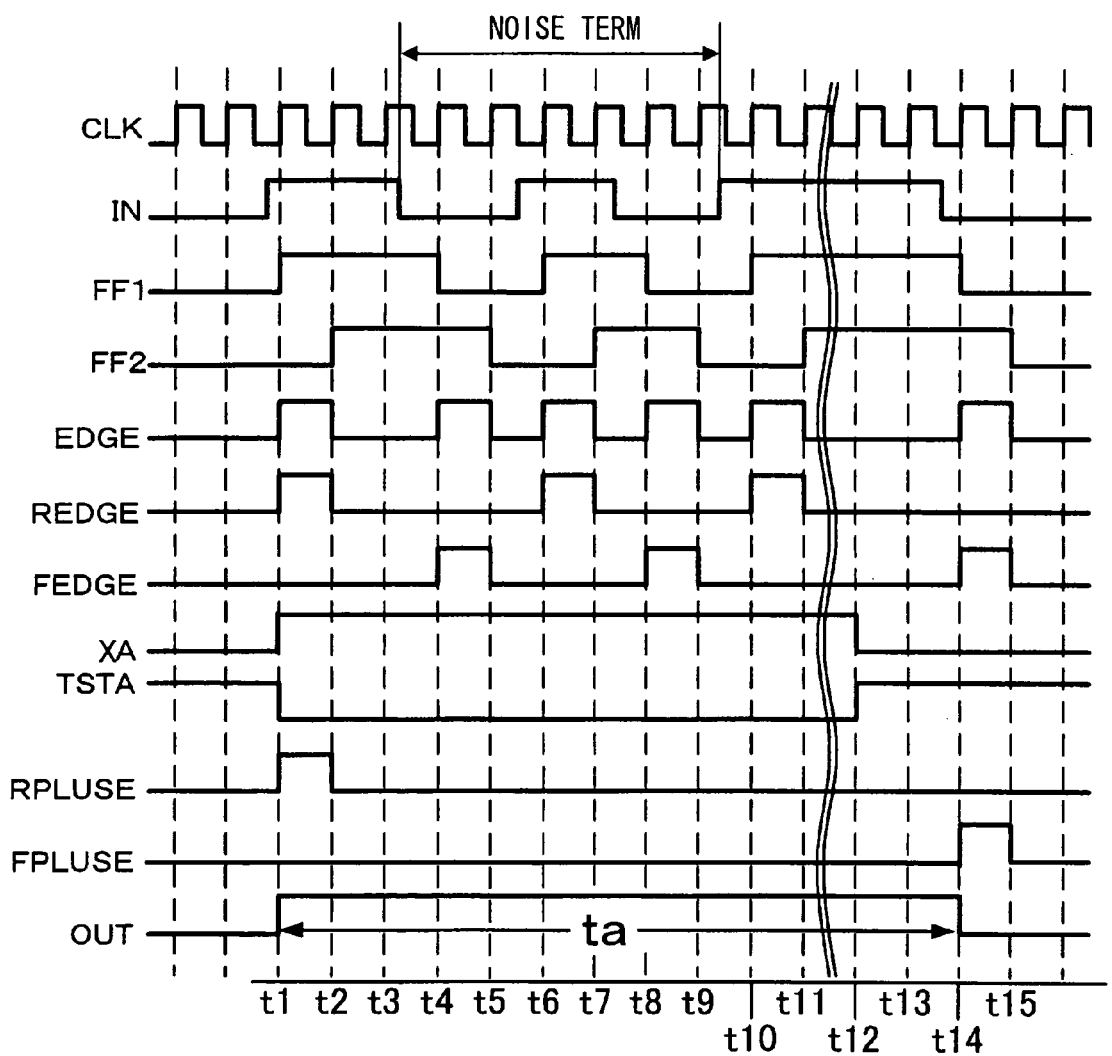
FIG. 11 is a timing diagram showing signals that generate at various points in the edge level holding circuit according the third embodiment.
Figure 12:
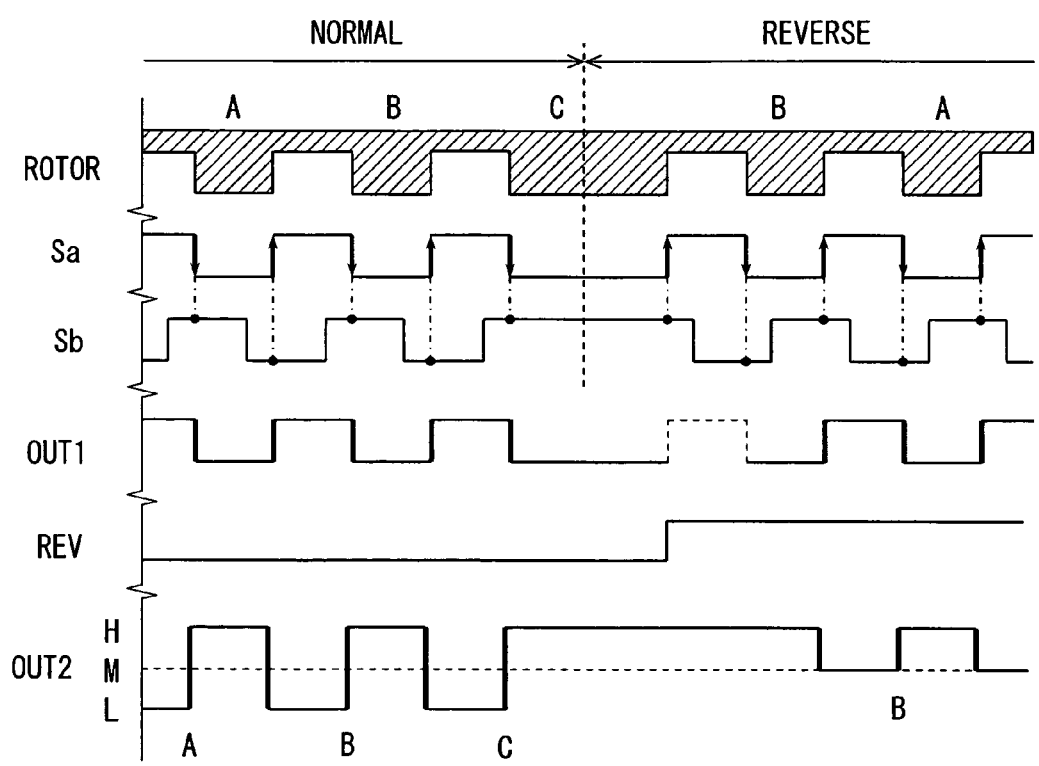
FIG. 12 is a timing diagram showing signals processed in a signal processing circuit according to the prior art.
Figure 13:
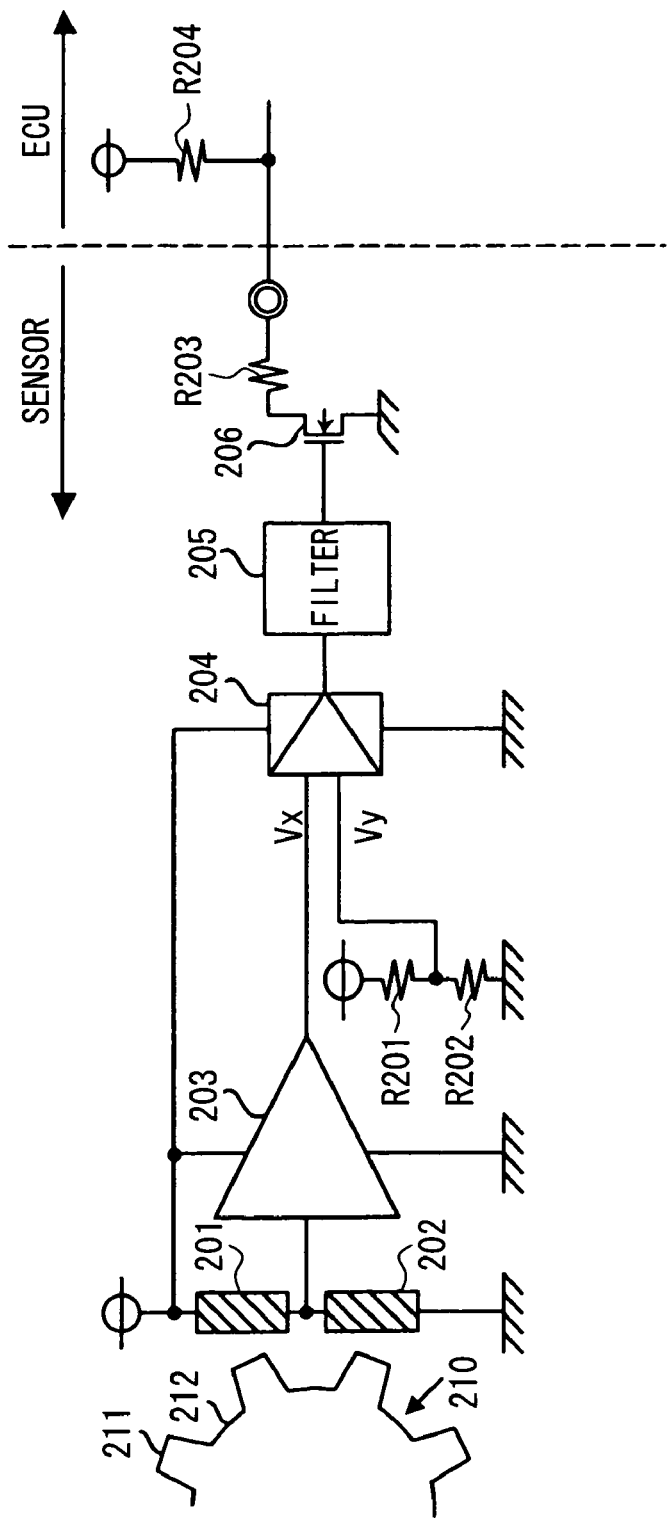
FIG. 13 is a block diagram showing a crank angle sensor according to an example of the related art.
Figure 14:
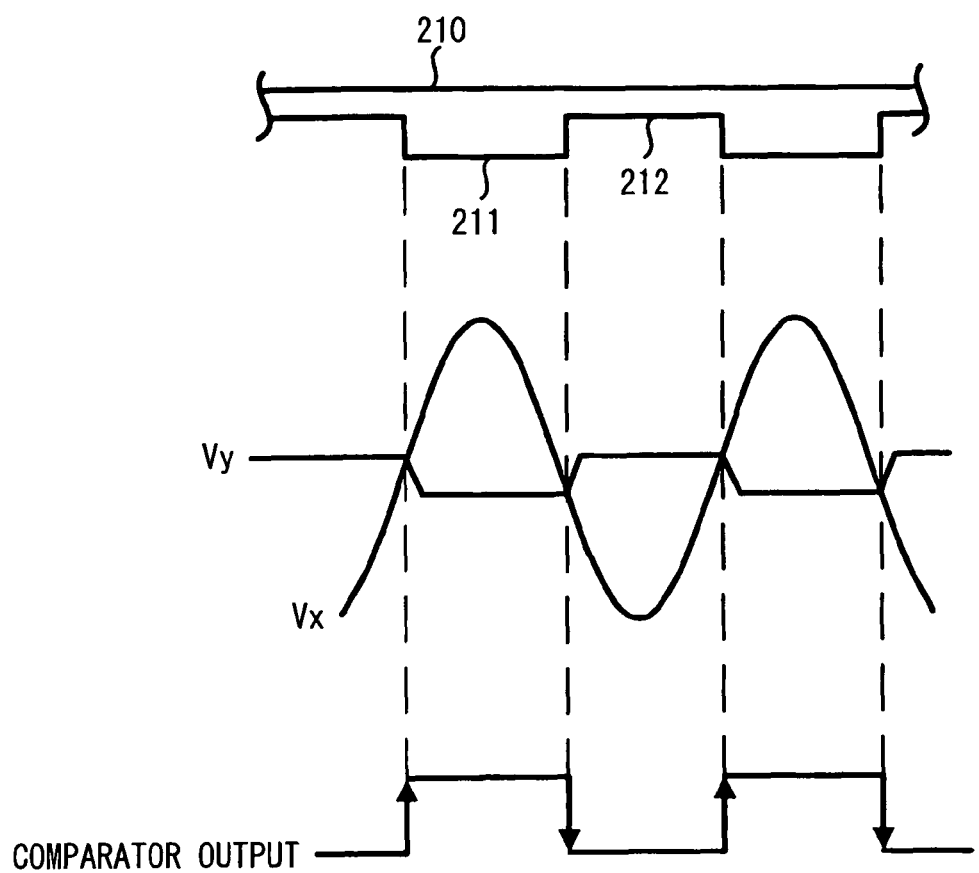
FIG. 14 is a timing diagram showing a relationship between position of gear teeth of a rotor and a detection signal of the crank angle sensor according to the example of the related art.
Figure 15:
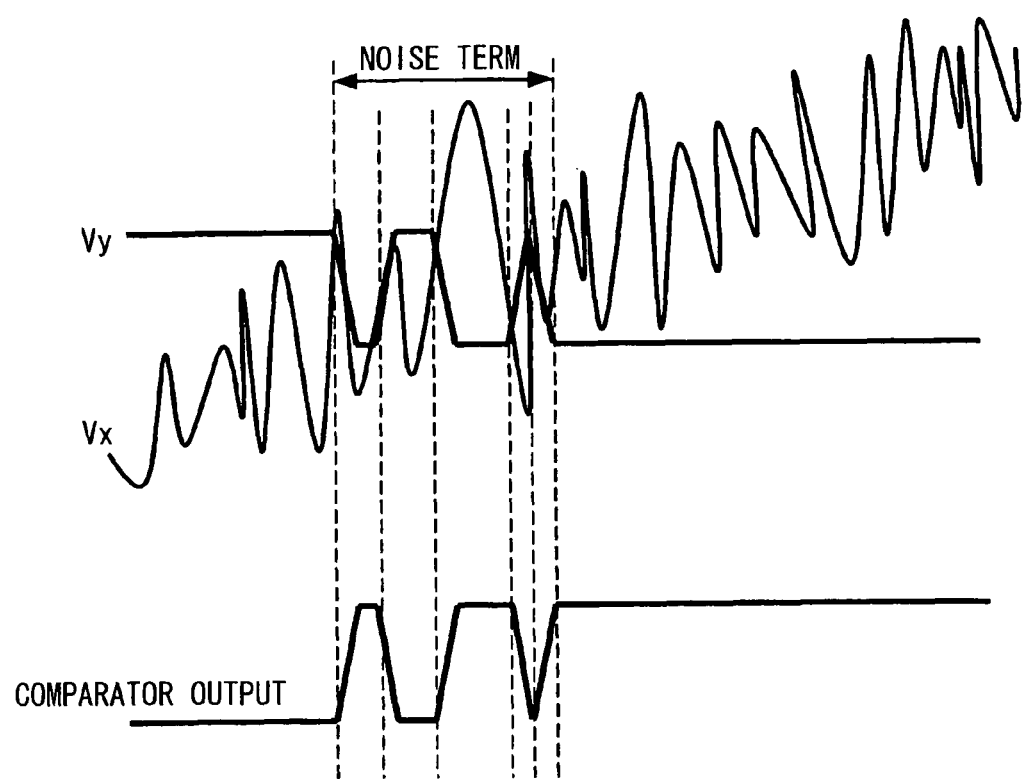
FIG. 15 a timing diagram in a case where a pulse signal output from a comparator is affected by a noise signal that enters the crank angle sensor according to the example of the related art.

Because input signals of the EXOR circuit 125 are the high level "1" and the low level "0," the EXOR circuit 125 outputs a high level signal at the time t1 as shown by EDGE in FIG. 11. Thus, the EXOR circuit 125 detects a time when the pulse signal input to the input terminal 150 transitions from the low level to the high level.

The high level signal output from the output terminal Q of the DFF circuit 123 is changed into a low level signal by the NOT circuit 143 and is input to the AND circuit 135. In addition, the high level signal output from the output terminal Q of the DFF circuit 121 is input to the AND circuit 135. Thus, at the time t1, the AND circuit 135 outputs a high level signal as shown by REDGE in FIG. 11.

The low level signal output from the output terminal Q of the DFF circuit 122 is input to the AND circuit 136. The high level signal output from the output terminal Q of the DFF circuit 121 is changed into a low level signal by the NOT circuit 144 and is input to the AND circuit 136. Thus, the AND circuit 136 outputs a low level signal as shown by FEDGE in FIG. 11.

The high level signal output from the EXOR circuit 125 is input to the input terminal D of the DFF circuit 139. The DFF circuit 139 outputs a high level signal from the output terminal Q to the clock terminal C of the DFF circuit 133. The input terminal D of the DFF circuit 133 is coupled with a power source and is continuously applied with a high level signal. Thus, when the high level signal is input to the clock terminal C, the DFF circuit 133 outputs a high level signal from the output terminal Q as shown by XA in FIG. 11.

The high level, signal output from the output terminal Q of the DFF circuit 133 is input to the OR circuits 140 and 141. Because the high level signal is input to the OR circuit 140, the OR circuit 140 outputs a high level signal at the time t1 as shown by RPULSE in FIG. 11. The high level signal output from the OR circuit 140 is input to the clock terminal C of the DFF circuit 124. The input terminal D of the DFF circuit 124 is coupled with the power source and is continuously applied with a high level signal. Thus, when the high level signal is input to the clock terminal C, the DFF circuit 124 outputs a high level signal from the output terminal Q.

The DFF circuit 124 continuously outputs a high level signal from the output terminal Q from when the OR circuit 140 outputs the high level signal till when the top land 111 and the bottom land 112 of the rotor 110 change in the next period, the pulse signal input to the input terminal 150 transitions to the low level, and the reset signal is input to the reset-bar terminal RB.

An example where the pulse signal input to the input terminal 150 is affected by a noise signal will now be described. In FIG. 11, a term when the pulse signal changes by being affected by the noise signal is shown as a noise term. During the noise term, although the pulse signal IN should be keep the high level, the pulse signal changes from the high level to the low level two times by being affected by the noise signal.

The DFF circuits 121 and 122 process the pulse signal affected by the noise signal same as a normal pulse signal. Thus, the DFF circuits 121 and 122 output the signals in accordance with level changes caused by the noise signal. The OR circuit 140 also output the signal in accordance with the level changes caused by the noise signal. However, because the high level signal is continuously input to the input terminal D of the DFF circuit 124, the DFF circuit 124 continuously outputs the high level signal from the output terminal Q regardless of an input level of the clock terminal C until the reset signal RST is input to the reset-bar terminal RB.

That is, even when the level of the pulse signal input to the input terminal 150 changes by being affected by a noise signal, the DFF circuit 124 can hold the edge level (high level) at the time when the pulse signal transitions from the low level to the high level for the first time in the half period from the time t1 to the time t14.

The high level signal output from the EXOR circuit 125 is also input to the clock terminal C of the DFF circuit 134. The input terminal D of the DFF circuit 134 is coupled with the power source and is continuously applied with a high level signal. Thus, when the high level signal is input to the clock terminal C, the DFF circuit 134 outputs a high level signal from the output terminal Q. The high level signal is changed into a low level signal by the NOT circuit 131 and is input to the timer circuit 170 through the output terminal 156.

Then, the timer circuit 170 starts to count a holding time "ta" when the DFF circuit 124 holds the high level signal. The holding time "ta" is set to be shorter than a time when the magnetic sensor 101 and 102 correspond to the pitch of the top lands 111 formed in the rotor 110. In a case where the noise term can be specified, the above-described time can be set to be longer than at least the noise term and shorter than the time corresponding to the pitch.

When the count time of the timer circuit 170 reaches the holding time at time t12, the timer circuit 170 outputs the high level signal to the input terminal 152 so that an edge level holding state is released and the edge level holding circuit 120 becomes a state where the edge level holding circuit 120 can hold the next edge level. Then, the output signals from the NAND circuits 137 and 138 transition to the high level, the DFF circuits 134 and 133 are reset, and the level of each of the output terminals Q transition to the low level. When the DFF circuit 133 is reset, a low level signal is output from the output terminal Q of the DFF circuit 133 to the OR circuit 141 at the time t12.

At the time t12, the pulse signal input to the input terminal 150 has not transitioned to the low level yet. Thus, the AND circuit 136 outputs the low level signal, the OR circuit 141 outputs the low level signal as shown by FPULSE in FIG. 11, and the NOR circuit 142 outputs the high level signal. Therefore, the DFF circuit 124 is not reset and keeps outputting the high level signal.

At the time t14, the half period elapses and the pulse signal input to the input terminal 150 transitions to the low level. Then, the output signal of the output terminal. Q of the DFF circuit 121 transitions from the high level to the low level, and the output signal of the DFF circuit 122 transitions to the low level to the high level. The output signal of the AND circuit 135 transitions to the high level to the low level, and the output signal of the AND circuit 136 transitions to the low level to the high level.

Because the output signal of the OR circuit 141 transitions to the low level to the high level, the output signal of the NOR circuit 142 transitions from the high level to the low level, and the DFF circuit 124 is reset. In addition, because the output signal of the OR circuit 140 transitions from the high level to the low level, the DFF circuit 124 outputs the low level signal from the output terminal Q. The DFF circuit 124 keeps outputting the low level signal until the input of the clock terminal C transitions to the high level in the next half period.

The edge level holding circuit 120 repeats the above-described process to the pulse signal input to the input terminal 150. The ECU calculates the intervals between the high level signals and the low level signals output from the edge level holding circuit 120, calculates the rotation angle of the rotor 110 based on the calculated result, and calculates the crank angle based on the rotation angle of the rotor 110.

Even when the pulse signal output from the filter circuit 105 is affected by a noise signal and thereby the level of the pulse signal changes, the crank angle sensor according to the present embodiment does not transmit the level change caused by the noise signal to the ECU. Thus, the ECU can calculate the crank angle with a high degree of accuracy.

The rotation-angle sensor according to the above-described embodiments can also be applied, for example, to an engine rotation sensor, a cam angle sensor, a vehicle speed sensor, an AT sensor, and a wheel speed sensor in addition to the crank angle sensor.

What is claimed is:

1. A signal processing circuit for a rotation detector that includes a first magnetic sensor and a second magnetic sensor, the first magnetic sensor and the second magnetic sensor arranged opposite a rotating object having gear teeth, the first magnetic sensor and the second magnetic sensor respectively outputting a first sensor signal and a second sensor signal in accordance with movement of top lands and bottom lands of the gear teeth when the rotor rotates in a normal direction or a reverse direction, each of the first sensor signal and the second sensor signal having a rectangular waveform, the signal processing circuit comprising:
a rotational direction determining portion configured to determine whether a rotational direction of the rotating object is the normal direction or the reverse direction based on a phase relationship between the first sensor signal and the second sensor signal;

an effective edge determining portion configured to determine whether a change in the first sensor signal is caused by an effective edge, the effective edge determining portion determining that the change in the first sensor signal is caused by the effective edge when the change is caused by one of front edges of the top lands while the rotating object is rotating in one of the normal direction and the reverse direction or when the change is caused by one of rear edges of the top lands while the rotating object is rotating in the other one of the normal direction and the reverse direction;

a normal-rotation pulse request holding portion configured to hold an output request signal of a normal-rotation pulse when the rotational direction determining portion determines that the rotational direction is the normal direction and the effective edge determining portion determines that the change in the first sensor signal is caused by the effective edge, the normal-rotation pulse indicating that the rotating object is rotating in the normal direction;

a reverse-rotation pulse request holding portion configured to hold an output request signal of a reverse-rotation pulse when the rotational direction determining portion determines that the rotational direction is the reverse direction and the effective edge determining portion determines that the change in the first sensor signal is caused by the effective edge, the reverse-rotation pulse indicating that the rotating object is rotating in the reverse direction;

an output request signal outputting portion configured so that when one of the normal-rotation pulse request holding portion and the reverse-rotation pulse request holding portion holds the output request signal, the output request signal outputting portion permits an output of the output request signal held by the one of the normal-rotation pulse request holding portion and the reverse-rotation pulse request holding portion, and when the other one of the normal-rotation pulse request holding portion and the reverse-rotation pulse request holding portion holds the output request signal in a state where the one of the normal-rotation pulse request holding portion and the reverse-rotation pulse request holding portion holds the output request signal, the output request signal outputting portion waits an output of the output request signal held by the other one of the normal-rotation pulse request holding portion and the reverse-rotation pulse request holding portion until the output request signal held by the one of the normal-rotation pulse request holding portion and the reverse-rotation pulse request holding portion is reset;

a pulse outputting portion configured to output one of the normal-rotation pulse and the reverse-rotation pulse based on the output request signal output from the output request signal outputting portion;

a first resetting portion configured so that after the pulse outputting portion ends an output of the one of the normal-rotation pulse and the reverse-rotation pulse, the first resetting portion resets the output request signal of the one of the normal-rotation pulse and the reverse-rotation pulse held by the one of the normal-rotation pulse request holding portion and the reverse-rotation pulse request holding portion; and a second resetting portion configured so that when the other one of the normal-rotation pulse request holding portion and the reverse-rotation pulse request holding portion holds the output request signal and then a condition for holding the output request signal that is already held by the one of the normal-rotation pulse request holding portion and the reverse-rotation pulse request holding portion is satisfied in a state where the one of the normal-rotation pulse request holding portion and the reverse-rotation pulse request holding portion holds the output request signal, the second resetting portion resets the output request signal held by the other one of the normal-rotation pulse request holding portion and the reverse-rotation pulse request holding portion.

2. The signal processing circuit according to claim 1, wherein when the second resetting portion resets the output request signal held by the other one of the normal-rotation pulse request holding portion and the reverse-rotation pulse request holding portion, the one of the normal-rotation pulse request holding portion and the reverse-rotation pulse request holding portion keeps holding the output request pulse without being influenced by a satisfaction of the condition for holding the output request signal.

3. The signal processing circuit according to claim 1, further comprising a timer portion, wherein the timer portion counts an elapsed time from when the pulse outputting portion starts the output of the one of the normal-rotation pulse and the reverse-rotation pulse, and when the elapsed time reaches a predetermined time, the timer portion outputs a signal to the pulse outputting portion so that the pulse outputting portion ends the output of the one of the normal-rotation pulse and the reverse-rotation pulse.

4. The signal processing circuit according to claim 3, wherein the timer portion has a first predetermined time for the normal-rotation pulse and a second predetermined time for the reverse-rotation pulse as the predetermined time compared with the elapsed time, and the first predetermined time and the second predetermined time are set to be different from each other so that the normal-rotation pulse and the reverse-rotation pulse have different pulse widths.

5. The signal processing circuit according to claim 3, wherein the timer portion outputs a reset signal to the first resetting portion when a predetermined adjusting time elapses after the pulse outputting portion ends the output of the one of the normal-rotation pulse and the reverse-rotation pulse, and the first resetting portion resets the output request signal of the one of the normal-rotation pulse and the reverse-rotation pulse held by the one of the normal-rotation pulse request holding portion and the reverse-rotation pulse request holding portion based on the reset signal.

6. A rotating angle sensor comprising:

a detecting portion configured to output an analog signal having an intensity that periodically changes in accordance with a change in a rotating angle of a rotating object;

a pulse signal generating circuit configured to compare the analog signal output from the detecting portion with a predetermined threshold value and generate a pulse signal based on a comparison result;

an edge level holding circuit configured to detect a first edge level of a first pulse signal that is generated by the pulse signal generating circuit in a half period of the analog signal and hold the first edge level for a predetermined time since the edge level holding circuit detects the first edge level;

a signal outputting circuit configured to output a signal having an edge level same as the first edge level held by the edge level holding circuit, wherein the edge level holding circuit ignores an edge level of the pulse signal other than the first edge level at least until the signal outputting circuit outputs the signal.

7. The rotating angle sensor according to claim 6, wherein the predetermined time is within a time from when the edge level holding circuit detects the first edge level till when a next half period of the analog signal starts.

8. The rotating angle sensor according to claim 6, wherein the signal outputting circuit is configured so that the signal outputting circuit outputs the signal before the predetermined time elapses.

9. The rotating angle sensor according to claim 6, wherein the edge level holding circuit includes:

an edge level detecting circuit configured to detect the edge level of the pulse signal generated by the pulse signal generating circuit;

a timer circuit configured to count the predetermined time; and a holding circuit configured to hold the first edge level of the first pulse signal detected by the edge level detecting circuit until a time counted by the timer circuit reaches the predetermined time.

10. The rotating angle sensor according to claim 9, wherein the timer circuit configured to count the predetermined time and a time when the signal outputting circuit outputs the signal.

11. The rotating angle sensor according to claim 6, wherein the predetermined time ends after the signal outputting circuit outputs the signal.

12. The rotating angle sensor according to claim 6, further comprising a filter circuit configured to filter the pulse signal generated by the pulse signal generating circuit, wherein the edge level holding circuit configured to detect the first edge level of the first pulse signal output from the filter circuit.

13. A rotating angle sensor comprising:

a detecting portion configured to output an analog signal having an intensity that periodically changes in accordance with a change in a rotating angle of a rotating object;

a pulse signal generating circuit configured to compare the analog signal output from the detecting portion with a predetermined threshold value and generate a pulse signal based on a comparison result; and a signal outputting circuit configured to detect a first edge level of a first pulse signal that is generated by the pulse signal generating circuit in a half period of the analog signal and continuously output a signal having the first edge level for a predetermined time from when the signal outputting circuit detects the first edge level till when the detecting portion outputs the analog signal in a next half period.

14. The signal processing circuit according to claim 13, wherein the signal outputting circuit includes:

an edge level detecting circuit configured to detect the edge level of the pulse signal generated by the pulse signal generating circuit; and a timer circuit configured to count the predetermined time, and wherein the signal outputting circuit configured to continuously output the signal having the first edge level of the first pulse signal detected by the edge level detecting circuit until a time counted by the timer circuit reaches the predetermined time.

15. The rotating angle sensor according to claim 13, further comprising a filter circuit configured to filter the pulse signal generated by the pulse signal generating circuit, wherein the signal outputting circuit configured to detect the first edge level of the first pulse signal output from the filter circuit.

* * * * *